United States Patent
Wu et al.

(10) Patent No.: US 8,932,454 B2
(45) Date of Patent: Jan. 13, 2015

(54) MESOPOROUS Y HYDROCRACKING CATALYST AND ASSOCIATED HYDROCRACKING PROCESSES

(71) Applicant: ExxonMobil Research and Engineering Company, Annandale, NJ (US)

(72) Inventors: Jianxin Jason Wu, Clinton, NJ (US); Ajit B. Dandekar, Bridgewater, NJ (US); Christopher G. Oliveri, Stewartsville, NJ (US)

(73) Assignee: ExxonMobile Research and Engineering Co., Annandale, NJ (US)

( * ) Notice: Subject to any disclaimer, the term of this patent is extended or adjusted under 35 U.S.C. 154(b) by 223 days.

(21) Appl. No.: 13/719,634

(22) Filed: Dec. 19, 2012

(65) Prior Publication Data
US 2013/0118954 A1 May 16, 2013

Related U.S. Application Data

(63) Continuation-in-part of application No. 12/584,376, filed on Sep. 4, 2009, now Pat. No. 8,361,434.

(60) Provisional application No. 61/192,391, filed on Sep. 18, 2008.

(51) Int. Cl.
*C10G 47/18* (2006.01)
*C10G 47/20* (2006.01)
(Continued)

(52) U.S. Cl.
CPC ............... *B01J 29/126* (2013.01); *C10G 47/18* (2013.01); *B01J 37/10* (2013.01); *B01J 29/084* (2013.01);
(Continued)

(58) Field of Classification Search
CPC ............... B01J 2229/16; B01J 2229/20; B01J 2229/22; B01J 2229/36; B01J 2229/42; B01J 29/084; B01J 29/088; B01J 29/126; B01J 29/146; B01J 29/166; B01J 35/109; B01J 37/10; C01B 39/026; C01B 39/24
USPC .............................. 208/111.3; 502/64, 66, 74
See application file for complete search history.

(56) References Cited

U.S. PATENT DOCUMENTS

| 3,130,007 A | 4/1964 | Breck |
| 3,375,065 A | 3/1968 | McDaniel et al. |

(Continued)

FOREIGN PATENT DOCUMENTS

| EP | 1938898 A1 | 9/2006 |
| EP | 1882676 A2 | 1/2008 |

(Continued)

OTHER PUBLICATIONS

The International Search Report and Written Opinion of PCT/US2012/070502 dated Aug. 16, 2013.

(Continued)

*Primary Examiner* — Walter D Griffin
*Assistant Examiner* — Derek Mueller
(74) *Attorney, Agent, or Firm* — Bruce M. Bordelon; Glenn T. Barrett; Chad A. Guice

(57) ABSTRACT

This invention relates to the composition, method of making and use of a hydrocracking catalyst that is comprised of a new Y zeolite which exhibits an exceptionally low small mesoporous peak around the 40 Å (angstrom) range as determined by nitrogen adsorption measurements. The hydrocracking catalysts of invention exhibit improved distillate yield and selectivity as well as improved conversions at lower temperatures than conventional hydrocracking catalysts containing Y zeolites. The hydrocracking catalysts herein are particularly useful in the hydrocracking processes as disclosed herein, particularly for conversion of heavy hydrocarbon feedstocks such as gas oils and vacuum tower bottoms and an associated maximization and/or improved selectivity of the distillate yield obtained from such hydrocracking processes.

73 Claims, 10 Drawing Sheets

Comparative Distillate Selectivities based on Different Active Metal Loadings

(51) Int. Cl.
*B01J 29/16* (2006.01)
*B01J 29/12* (2006.01)
*B01J 37/10* (2006.01)
*B01J 29/08* (2006.01)
*B01J 35/10* (2006.01)
*C01B 39/24* (2006.01)
*B01J 29/14* (2006.01)
*C01B 39/02* (2006.01)

(52) U.S. Cl.
CPC .............. *B01J 29/088* (2013.01); *B01J 35/109* (2013.01); *C01B 39/24* (2013.01); *B01J 29/146* (2013.01); *B01J 29/166* (2013.01); *C10G 47/20* (2013.01); *C01B 39/026* (2013.01); *B01J 2229/16* (2013.01); *B01J 2229/22* (2013.01); *B01J 2229/36* (2013.01); *B01J 2229/20* (2013.01); *B01J 2229/42* (2013.01)
USPC ............... 208/111.3; 502/56; 502/66; 502/74

(56) References Cited

U.S. PATENT DOCUMENTS

| | | | |
|---|---|---|---|
| 3,702,886 | A | 11/1972 | Argauer et al. |
| 3,709,979 | A | 1/1973 | Chu |
| 3,770,614 | A | 11/1973 | Graven |
| 3,781,199 | A | 12/1973 | Ward |
| 3,832,449 | A | 8/1974 | Rosinski et al. |
| 3,948,758 | A | 4/1976 | Bonacci et al. |
| 4,016,245 | A | 4/1977 | Plank et al. |
| 4,076,842 | A | 2/1978 | Plank et al. |
| 4,086,187 | A | 4/1978 | Lim et al. |
| 4,206,085 | A | 6/1980 | Lim et al. |
| 4,254,297 | A | 3/1981 | Frenken et al. |
| 4,310,440 | A | 1/1982 | Wilson et al. |
| 4,440,871 | A | 4/1984 | Lok et al. |
| 4,500,651 | A | 2/1985 | Lok et al. |
| 4,661,239 | A | 4/1987 | Steigleder |
| 4,663,025 | A | 5/1987 | Fu |
| 5,069,890 | A | 12/1991 | Dai et al. |
| 5,087,348 | A | 2/1992 | Dai et al. |
| 5,342,507 | A | 8/1994 | Dai et al. |
| 5,354,452 | A | 10/1994 | Dai et al. |
| 5,534,135 | A | 7/1996 | Dai et al. |
| 5,538,710 | A | 7/1996 | Guo et al. |
| 5,601,798 | A | 2/1997 | Cooper et al. |
| 5,849,258 | A | 12/1998 | Lujano et al. |
| 5,902,564 | A | 5/1999 | Lujano et al. |
| 6,054,113 | A | 4/2000 | Vaughan et al. |
| 6,746,659 | B2 | 6/2004 | Pinnavaia et al. |
| 7,589,041 | B2 | 9/2009 | Ying et al. |
| 2001/0044372 | A1 | 11/2001 | Vaughan et al. |
| 2007/0227351 | A1 | 10/2007 | Garcia-Martinez |
| 2007/0244347 | A1 | 10/2007 | Ying et al. |
| 2008/0014140 | A1 | 1/2008 | Christensen et al. |
| 2008/0138274 | A1 | 6/2008 | Garcia-Martinez |
| 2009/0005236 | A1 | 1/2009 | Ying et al. |
| 2009/0082193 | A1 | 3/2009 | Wachter |
| 2009/0090657 | A1 | 4/2009 | Ying et al. |
| 2009/0110631 | A1 | 4/2009 | Garcia-Martinez |
| 2009/0118556 | A1 | 5/2009 | Euzen et al. |
| 2009/0139900 | A1 | 6/2009 | Wachter et al. |
| 2009/0283443 | A1 | 11/2009 | Kuroda et al. |
| 2009/0326177 | A1 | 12/2009 | Ying et al. |
| 2010/0065477 | A1 | 3/2010 | Wu |
| 2010/0092383 | A1 | 4/2010 | Ying et al. |
| 2011/0220549 | A1 | 9/2011 | Wu et al. |
| 2011/0224068 | A1 | 9/2011 | Habib, Jr. et al. |
| 2012/0080357 | A1 | 4/2012 | Novak et al. |
| 2013/0026070 | A1 | 1/2013 | Oliveri et al. |
| 2013/0029832 | A1 | 1/2013 | Lai et al. |

FOREIGN PATENT DOCUMENTS

| | | |
|---|---|---|
| WO | 2004050548 A2 | 6/2004 |
| WO | 2009062742 A2 | 5/2009 |

OTHER PUBLICATIONS

ASTM Standard Designation D4641-12, "Standard Practice for Calculation of Pore Size Distributions of Catalysts and Catalyst Carriers from Nitrogen Desorption Isotherms", 2012.

S. Lowell; J.E. Shields; M.A. Thomas; M. Thommes, "Characterization of Porous Solids and Powders: Surface Area, Pore Size and Density", (2006), pp. 117-123.

ASTM Standard Designation D4222-03, "Standard Test Method for Determination of Nitrogen Adsorption and Desorption Isotherms of Catalysts and Catalyst Carriers by Static Volumetric Measurements", 2008.

L. Teyssier; M. Thomas; C. Bouchy; J.A. Martens; E. Guillon, "Liquid chromatography method for quantification of surface connected mesoporosity in ultrastable Y zeolites", Microporous and Mesoporous Materials, (2007), pp. 6-11, vol. 100.

A.H. Janssen; A.J. Koster; K.P. De Jong, "On the Shape of the Mesopores in Zeolite Y: A Three-Dimensional Transmission Electron Microscopy Study Combined with Texture Analysis", J. Phys. Chem. B., (2002), pp. 11905-11909, vol. 106.

Koichi Sato; Yoichi Nishimura; Nobuyuki Matsubayashi; Motoyasu Imamura; Hiromichi Shimada, "Structural changes of Y zeolites during ion exchange treatment: effects of Si/Al ratio of the starting NaY", Microporous and Mesoporous Materials, (2003), pp. 133-146, vol. 59.

Elliott P. Barrett; Leslie G. Joyner; Paul P. Halenda, "The Determination of Pore Volume and Area Distributions in Porous Substances. I. Computations from Nitrogen Isotherms", Journal of American Chemistry Society, (1951), pp. 373-380, vol. 73.

Andries H. Janssen; Abraham J. Koster; Krijn P. De Jong, "Three-Dimensional Transmission Electron Microscopy Observations of Mesopores in Dealuminated Zeolite Y", Angew. Chem. Int. Ed., (2001), pp. 1102-1104, vol. 40, Iss. 6.

PRIOR ART

BJH Nitrogen Desorption Plot of USY Zeolite (as fabricated)

PRIOR ART

BJH Nitrogen Desorption Plot of USY Zeolite (after deactivation steaming)

BJH Nitrogen Desorption Plot of EMY Zeolite (as fabricated)

BJH Nitrogen Desorption Plot of USY Zeolite (after deactivation steaming)

Comparative Distillate Yields based on Different Active Metal Loadings

Comparative Distillate Selectivities based on Different Active Metal Loadings

MESOPOROUS Y HYDROCRACKING CATALYST AND ASSOCIATED HYDROCRACKING PROCESSES

CROSS REFERENCE TO RELATED APPLICATIONS

This application is a Continuation-in-Part of U.S. application Ser. No. 12/584,376 filed Sep. 4, 2009, which claim priority to U.S. Provisional Application No. 61/192,391 filed Sep. 18, 2008, which are both herein incorporated by reference in their entirety.

FIELD OF THE INVENTION

This invention relates to the composition, method of making and use of a hydrocracking catalyst that is comprised of a new Y zeolite which exhibits an exceptionally low small mesoporous peak height around the 40 Å (angstrom) range as determined by nitrogen adsorption measurements and shown in the BJH $N_2$ Desorption Plot. The hydrocracking catalysts herein which comprise this zeolite exhibit improved distillate yield and selectivity as well as improved conversions at lower temperatures than conventional hydrocracking catalysts containing Y zeolites.

BACKGROUND

Conversion of high molecular weight petroleum feeds to more valuable products by catalytic processes such as hydrocracking is important to petroleum processes. Hydrocracking of relatively high boiling point hydrocarbons, such as atmospheric and vacuum gasoil cuts from crude oil, is generally done to form a converted product having a more useful boiling point, so that it can be predominantly used in any one or more of a variety of fuels, such as naphtha (motor gasoline), jet fuel, kerosene, diesel, and the like. Usually, however, particularly when targeting distillate product fractions, the hydrocracking reaction is run at relatively low severity or relatively low hydrocracking conversion, so that the higher boiling point hydrocarbons are not cracked too much, as higher conversions typically generate increasing quantities of material boiling in the ranges below naphtha, which low boiling material tends not to be as commercially useful as the fuel compositions. However, running at these lower temperatures (severities), tend to reduce the overall product conversions. While maintaining a better selectivity for distillates, overall conversion, as well as overall distillate production can be significantly decreased.

Additionally, with hydrocracking catalysts of the art, low overall process conversions leave behind higher quantities of higher boiling range hydrocarbons that cannot be used as fuels and that tend to have poor properties for use in such applications as lubricants, without further significant processing steps. Such steps can add complexity and cost to dealing with such otherwise unusable higher boiling range hydrocarbons, and options such as coking for such hydrocarbons can offer relatively marginal return on investment.

There are many patent publications that disclose hydrocracking processes for attaining good fuels properties, and also for attaining good lubes properties. A non-exclusive list of such publications includes, for example, U.S. Pat. Nos. 5,282,958, 5,953,414, 6,413,412, 6,652,735, 6,723,889, 7,077,948, 7,261,805, and 7,300,900, U.S. Patent Application Publication Nos. 2003/0085154, 2004/0050753, 2004/0118744, and 2009/0166256, and European Patent Nos. 0 649 896 and 0 743 351.

Nevertheless, it would be desirable to discover improved hydrocracking catalysts compositions and associated hydrocracking processes in Which a higher boiling point hydrocarbon, such as a vacuum gasoil, can be hydroprocessed (hydrocracked) to allow beneficial use of the converted portion in fuels compositions while increasing both the conversion of the 700° F.+ boiling point materials in the hydrocracker feedstream, while increasing the amount that is selectively cracked into distillate range materials (i.e., the "400-700° F. Yield").

SUMMARY

This invention includes in part the composition, method of making and use of a hydrocracking catalyst that is comprised of a Y zeolite which exhibits an exceptionally low small mesoporous peak height around the 40 Å (angstrom) range as measured by nitrogen adsorption and shown in the BJH $N_2$ Desorption Plot. The hydrocracking catalysts made from this zeolite, and as described herein, exhibit improved rates of heavy oil cracking with improved low temperature conversion rates (i.e., "750° F.+ Conversion") as well as improved selectivities of distillate yields ("i.e., 400-700° F. Yield"). The present invention includes the composition, method of making and use of hydrocracking catalysts incorporating an extra mesoporous Y zeolite (termed herein as "EMY" zeolite) which has improved mesoporous properties over Y zeolites of the prior art, as well as a method of making the zeolite and its use in associated hydrocracking process. This zeolite is described herein as well as described further in parent application U.S. Ser. No. 12/584,376 entitled "Extra Mesoporous Y Zeolite", which is incorporated in its entirety herein.

In one embodiment herein is described a hydrocracking catalyst comprised of:
 a Y zeolite with a Large Mesopore Volume of at least about 0.03 cm$^3$/g and a Small Mesopore Peak of less than about 0.15 cm$^3$/g;
 an inorganic matrix; and
 at least one active metal selected from Group 6 and Group 8/9/10 metals.

In yet another embodiment herein is described a method of making a hydrocracking catalyst, comprising the steps of:
 a) making a zeolite from a zeolite precursor;
 b) combining a binder precursor selected from a silica, an alumina, or a combination thereof, with a zeolite to form a catalyst mixture;
 c) drying the catalyst mixture to form a catalyst precursor; and
 d) adding at least one active metal to the catalyst precursor to form the hydrocracking catalyst;
 wherein the zeolite is a Y zeolite with a Large Mesopore Volume of at least about 0.03 cm$^3$/g and a Small Mesopore Peak of less than about 0.15 cm$^3$/g.

In still yet another embodiment herein is described a hydrocracking process for selectively catalytically cracking a hydrocarbon feedstock to form a distillate product, comprising:
 a) contacting the hydrocarbon feedstock, in the presence of hydrogen, with a hydrocracking catalyst comprised of a Y zeolite with a Large Mesopore Volume of at least about 0.03 cm$^3$/g and a Small Mesopore Peak of less than about 0.15 cm$^3$/g; an inorganic matrix; and at least one active metal selected from Group 6 and Group 8/9/10 metals under hydrocracking conditions; and
 b) producing at least one distillate product stream boiling in the range of about 400 to 700° F., which has a lower average molecular weight than the hydrocarbon feedstock;

wherein the zeolite has a Large Mesopore Volume of at least about 0.03 cm$^3$/g, and a Small Mesopore Peak of less than about 0.15 cm$^3$/g.

DETAILED DESCRIPTION OF THE EMBODIMENTS

Figure 1:
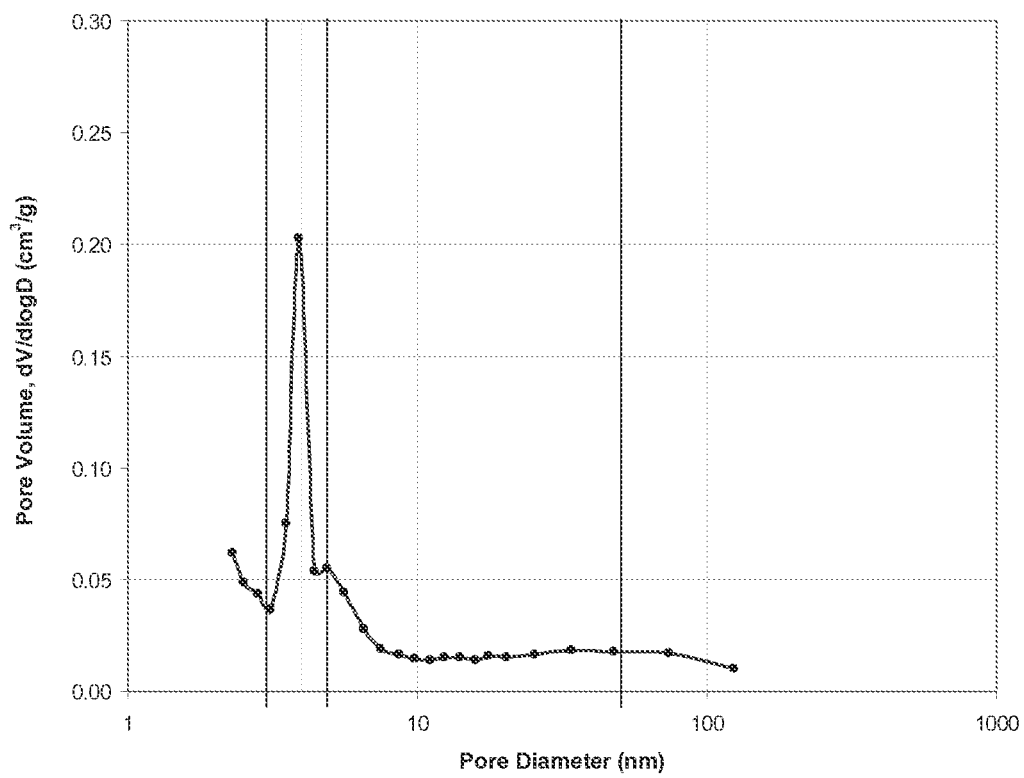
FIG. 1 is a BJH N$_2$ Desorption Plot of a USY zeolite from a commercially available ammonium-Y zeolite (prior art).

The hydrocracking catalyst of the present invention incorporates the use of an Extra Mesoporous Y ("EMY") zeolite and its use in hydrocarbon cracking catalysts. This zeolite is described herein as well as described further in U.S. Ser. No. 12/584,376 entitled "Extra Mesoporous Y Zeolite", which is incorporated in its entirety herein. The hydrocracking catalysts herein comprising this new zeolite have been unexpectedly found to exhibit improved rates of heavy oil cracking with improved low temperature conversion rates (i.e., "750° F.+ Conversion") as well as improved selectivities of distillate yields ("i.e., 400-700° F. Yield") when utilized in the hydrocracking processes of the present invention.

In the hydrocracking catalysts of the present invention is utilized what is termed herein as an EMY zeolite which is a Y structure zeolite with a suppressed "small mesopore peak" that is commonly found associated within the "small mesopores" (30 to 50 Å pore diameters) of commercial Y-type zeolites, while maintaining a substantial volume of pores in the "large mesopores" (greater than 50 to 500 Å pore diameters) of the zeolite. International Union of Pure and Applied Chemistry ("IUPAC") standards defines "mesopores" as having pore diameters greater than 20 to less than 500 Angstroms (Å). However, the standard nitrogen desorption measurements as used herein do not provide pore volume data below about 22 Å. Additionally, since the "small mesopore peak" found in Y zeolites are substantially confined between the 30 and 50 Å ranges, it is sufficient to define the measurable mesoporous pore diameter range for the purposes of this invention as pore diameters from 30 to 500 Angstroms (Å).

Therefore, as utilized herein, the terms "Small Mesopore(s)" or "Small Mesoporous" are defined as those pore structures in the zeolite crystal with a pore diameter of 30 to 50 Angstroms (Å). Similarly, the terms "Large Mesopore(s)" or "Large Mesoporous" as utilized herein are defined as those pore structures in the zeolite crystal with a pore diameter of greater than 50 to 500 Angstroms (Å). The terms "Mesopore(s)" or "Mesoporous" when utilized herein alone (i.e., not in conjunction with a "small" or "large" adjective) are defined herein as those pore structures in the zeolite crystal with a pore diameter of 30 to 500 Angstroms (Å). Unless otherwise noted, the unit of measurement used for mesoporous pore diameters herein is in Angstroms (Å).

The term "Small Mesopore Volume" or "Small Mesoporous Volume" of a material as used herein is defined as the total pore volume of the pores per unit mass in the Small Mesopore range as measured and calculated by ASTM Standard D 4222 "Determination of Nitrogen Adsorption and Desorption Isotherms of Catalysts and Catalyst Carriers by Static Volumetric Measurements"; ASTM Standard D 4641 "Calculation of Pore Size Distributions of Catalysts from Nitrogen Desorption Isotherms"; and "The Determination of Pore Volume and Area Distributions in Porous Substances, I. Computations from Nitrogen Isotherms", by Barrett, E. P.; Joyner, L. S.; and Halenda, P. P.; *Journal of American Chemical Society*; vol. 73, pp. 373-380 (1951), all of which are incorporated herein by reference. Unless otherwise noted, the unit of measurement for mesopore volume is in cm$^3$/g.

The term "Large Mesopore Volume" or "Large Mesoporous Volume" of a material as used herein is defined as the total pore volume of the pores per unit mass in the Large Mesopore range as measured and calculated by ASTM Standard D 4222 "Determination of Nitrogen Adsorption and Desorption Isotherms of Catalysts and Catalyst Carriers by Static Volumetric Measurements"; ASTM Standard D 4641 "Calculation of Pore Size Distributions of Catalysts from Nitrogen Desorption Isotherms"; and "The Determination of Pore Volume and Area Distributions in Porous Substances, I. Computations from Nitrogen Isotherms", by Barrett, E. P.; Joyner, L. S.; and Halenda, P. P.; *J. Amer. Chem. Soc.*; vol. 73, pp. 373-380 (1951). Unless otherwise noted, the unit of measurement for mesopore volume is in cm$^3$/g.

The term "Large-to-Small Pore Volume Ratio" or "LSPVP" of a material as used herein is defined as the ratio of the Large Mesopore Volume to the Small Mesopore Volume (dimensionless).

The term "BJH N$_2$ Desorption Plot" as used herein is defined as a plot of the change in unit volume of a mesoporous material as a function of the pore diameter of the mesoporous material. Herein, the "BJH N$_2$ Desorption Plot" is shown as the pore volume calculated as dV/dlogD (in cm$^3$/g) vs. the pore diameter (in nanometers) as determined by the ASTM Standard D 4222, ASTM Standard D 4641, and "The Determination of Pore Volume and Area Distributions in Porous Substances, I. Computations from Nitrogen Isotherms", by Barrett, E. P.; Joyner, L. S.; and Halenda, P. P.; *Journal of American Chemical Society*; vol. 73, pp. 373-380 (1951), (i.e., the "BJH method" for calculating the pore distribution of a porous substance) as referenced in the definitions above. The BJH N$_2$ Desorption Plot should be generated from approximately 15 to 30 data points at approximately equidistant positions on a logarithmic x-axis of the pore diameter (nanometers) between the values of 3 to 50 nanometers (30 to 500 Å). The pore volume value on the y-axis of the plot is commonly calculated in industry equipment as an interpolated value of the incremental change in volume, dV (Where V is in cm$^3$, and dV is in cm$^3$) divided by the incremental change in the log of the pore diameter, dlogD (where D is in nanometers, and dlogD is unitless) and is adjusted to the unit weight of the sample in grams. Therefore, the "pore volume" (which is the common term utilized in the industry) as shown on the y-axis of the BJH N$_2$ Desorption Plot may be more appropriately described as an incremental pore volume per unit mass and is expressed herein in the units cm$^3$/g. It should be noted that the "pore volume" value on the y-axis of the BJH N$_2$ Desorption Plot is not synonymous with the "Small Mesopore Volume" and "Large Mesopore Volume" as described above which are calculated unit pore volumes over a range of pore diameters. However, these calculations and terms as used herein are familiar to those of skill in the art. All measurements and data plots as utilized herein were made with a Micromeritics® Tristar 3000® analyzer.

The term "Small Mesopore Peak" as used herein refers to the property of a zeolite and is defined as the maximum pore volume value calculated as dV/dlogD (y-axis) on a BJH N$_2$ Desorption Plot as described above (pore volume vs. pore diameter) between the 30 Å and 50 Å pore diameter range (x-axis). Unless otherwise noted, the unit of measurement for the small mesopore peak is in cm$^3$/g.

The term "40 Å Peak" or "40 Å Peak Height" as used herein refers to the property of a catalyst and is defined as the maximum pore volume value calculated as dV/dlogD (y-axis) on a BJH N$_2$ Desorption Plot as described above (pore volume vs. pore diameter) at 40 Å pore diameter (x-axis). Unless otherwise noted, the unit of measurement for the 40 Å Peak is in cm$^3$/g.

The term "Large Mesopore Peak" used herein refers to the property of a zeolite and is defined as the maximum pore volume value calculated as dV/dlogD (y-axis) on a BJH N$_2$ Desorption Plot as described above (pore volume vs. pore diameter) between the 50 Å and 500 Å pore diameter range (x-axis). Unless otherwise noted, the unit of measurement for the large mesopore peak is in cm$^3$/g.

The term "BET Surface Area" for a material as used herein is defined as the surface area as determined by ASTM Specification D 3663. Unless otherwise noted, the unit of measurement for surface area is in m$^2$/g.

The term "Unit Cell Size" for a material as used herein is defined as the unit cell size as determined by ASTM Specification D 3942. Unless otherwise noted, the unit of measurement used for unit cell size herein is in Angstroms (Å).

While not wishing to be held to any specific theory, it is believed herein that a problem that exists with the existing Y zeolites in the industry in that some of these Y-type zeolites (e.g., Na—Y zeolites), while widely used in the industry, exhibit a "peak" in the small mesopore range (30 to 50 Å pore diameters) while exhibiting no significant pore volume associated with the large mesopore range (50 to 500 Å pore diameters). Conversely, other Y-type zeolites USY zeolites), exhibit a significant "peak" in the small mesopore range (30 to 50 Å pore diameters) when some large mesopores are present. It is believed and is discovered herein that the pore volume in the small mesopore range (30 to 50 Å pore diameters) of these zeolite contributes to unwanted adverse conversion effects when utilized in hydrocarbon cracking processes.

As discussed, conventional Y zeolites contain a significant volume associated with pores in the range of 30 to 50 Å diameter, which are easily observed by a standard nitrogen adsorption-desorption test as interpreted by the BJH method. FIG. 1 shows a typical the BJH N$_2$ Desorption Plot of a typical USY zeolite. As can be seen in FIG. 1, the USY exhibits a high volume of pores in the "small mesoporous" range (30 to 50 Å pore diameter) as well as a significant "small mesopore peak" in the BJH N$_2$ Desorption Plot of about 0.20 cm$^3$/g or more in this small mesopore range. This high peak in the 30 to 50 Å pore diameter range of the BJH N$_2$ Desorption Plot is a common feature for Y-zeolite materials that possess a significant pore volume in the mesoporous range (30 to 500 Å pore diameters). This peak exhibited in the BJH N$_2$ Desorption Plot of the Y zeolites is termed herein as the "Small Mesopore Peak" of the zeolite and is defined above. Without wishing to be held to any theory, it is believed that this phenomenon occurs due to a "bottlenecking" of some of the mesoporous structures in the zeolite creating an ink-bottle effect wherein a significant amount of the nitrogen inside the internal pore cavities cannot be released during the desorption phase of the test until the partial pressure is reduced below the point associated with this small mesopore peak point. Typically in a standard nitrogen adsorption/desorption test this peak is associated at a point in the desorption branch at a relative nitrogen pressure (P/P$_o$) of about 0.4 to about 0.45. See "Characterization of Porous Solids and Powders: Surface Area, Pore Size and Density", by Lowell, S., Shields, J. E., Thomas, M. A., and Thommes, M., pp. 117-123, (Springer, Netherlands 2006), which is incorporated herein by reference.

As can further be seen in FIG. 1, there is no significant "large mesopore peak" associated with the large mesoporous structure (50 to 500 Å pore diameter range) of the USY zeolite. The USY sample of this example is further described in Example 1. While USY zeolites do not possess a significant volume of large mesopores (in the 50 and 500 Å diameter range) upon fabrication, they may develop these large mesopores upon steaming at high temperatures. A common test in the industry is to contact the zeolite with a high temperature steam (for example, 100% partial pressure steam at 1400° F. for 16 hours) to determine the hydrothermal stability of the zeolite. However, upon severe steaming, Y-type zeolites also tend to increase the pore volume associated with the large mesopores, and the surface area of the zeolite tends to diminish as the steaming conditions become more severe.

Figure 2:
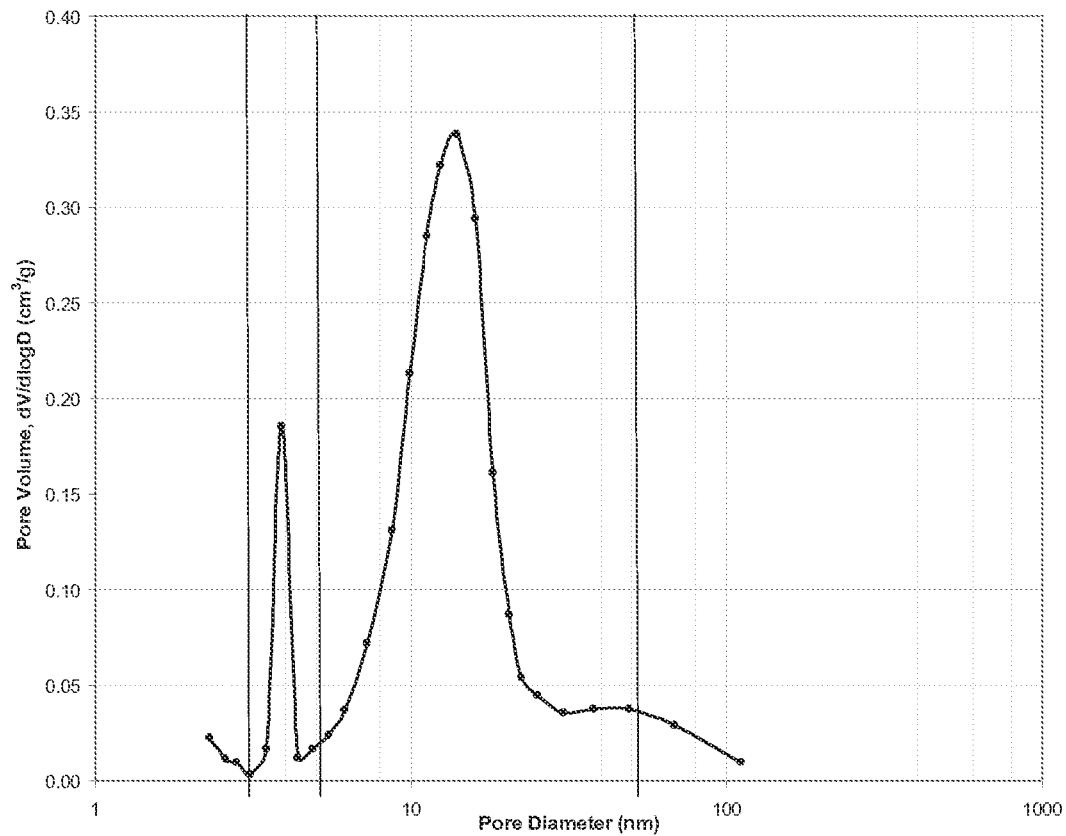
FIG. 2 is a BJH N$_2$ Desorption Plot of the USY zeolite of FIG. 1 (prior art) after it has been subjected to ion exchange/calcination steps and long-term deactivation steaming at 1400° F. for 16 hours.

According to the details of Example 1, a conventional USY sample as described above and shown in FIG. 1 was further ammonium ion-exchanged three times and then steamed at 1400° F. for 16 hours to determine the resulting pore distribution and surface area stability of the USY zeolite under these hydrothermal conditions. FIG. 2 shows the BJH N$_2$ Desorption Plot of the ion-exchanged USY zeolite after long-term deactivation steaming. As can be seen from FIG. 2, the steamed USY develops a "large mesopore peak" in the large mesoporous structures (50 to 500 Å pore diameter range) of the zeolite. However, as also can be seen in FIG. 2, the "small mesopore peak", associated with pores in the 30 to 50 Å pore diameter range of the steamed USY, is not significantly decreased as compared to the small mesopore peak of the un-steamed USY sample as shown in FIG. 1. Here, the small mesopore peak of the steamed USY is about 0.19 cm$^3$/g.

While not wishing to be held to any theory, it is believed that the small and large mesoporous pore structures of the zeolite are created by defects and/or deterioration of the zeolite crystalline structure, thereby creating structural defect voids (or equivalent "pores") that are larger in size than those of the as-synthesized (pure crystal) structure of the zeolite.

The hydrocracking catalysts of the present invention utilize a highly stable Y-zeolite that has a significantly suppressed small mesopore peak in both the as-fabricated and as-steamed conditions while maintaining a high volume of large mesopores (50 to 500 Å pore diameter range). In another embodiment of the present invention, is a hydrocracking catalyst comprised of a highly stable Y-zeolite that has a significantly suppressed small mesopore peak in both the as-fabricated and as-steamed conditions while maintaining a high ratio of large-to-small mesoporous volume. The zeolite utilized in the hydrocracking catalysts of this invention is termed herein as an "Extra Mesoporous Y" (or "EMY") zeolite.

In an embodiment of the hydrocracking catalysts of the present invention, is utilized an EMY zeolite, which can be obtained from a starting material of a conventional Na—Y type zeolite with a sodium oxide ($Na_2O$) content of about 10 to 15 wt %. In an embodiment of the present invention, the EMY zeolite precursor is ammonium-exchanged to lower the $Na_2O$ content to a desired level for the production of an EMY zeolite. Generally, about one to about three ammonium-exchanges are required to reduce the $Na_2O$ content of a typical Na—Y precursor to a desired level for the production of an EMY zeolite. Based on fabrication testing, it is believed by the inventor at this time that the sodium level of the EMY precursor must be maintained in certain ranges in order to obtain an EMY zeolite. In a preferred embodiment of the present invention, the $Na_2O$ content of the ammonium-exchanged Na—Y zeolite precursor is brought to about 2.0 to about 5.0 wt % $Na_2O$. More preferably, the $Na_2O$ content of the ammonium-exchanged Na—Y zeolite precursor is brought to about 2.3 to about 4.0 wt % $Na_2O$. In this preferred embodiment, it is believed that the number of ion-exchange steps performed is not essential to the formation of EMY as long as the $Na_2O$ content of the EMY precursor is within a desired range. Unless otherwise noted, the $Na_2O$ content is as measured on the zeolite precursor prior to high temperature steam calcination and reported on a dry basis.

The EMY precursors or the final EMY zeolite may also be rare earth exchanged to obtain a rare earth exchanged EMY or "RE-EMY" zeolite. The zeolites may be rare earth exchanged in accordance with any ion-exchange procedure known in the art. It should also be noted that the weight percentages used herein are based on the dry weight of the zeolite materials.

The ammonium-exchanged Na—Y precursor thus obtained is subjected to a very rapid high temperature steam calcination. In this high temperature steam calcination process, the temperature of the steam is from about 1200 to about 1500° F. More preferably the temperature of the steam is from about 1200 to about 1450° F., more preferably from about 1250 to about 1450° F., and even more preferably from about 1300 to about 1450° F. These high temperature steam calcination temperatures for the production of an EMY zeolite are generally higher than those used in the production of conventional USY zeolites which are high temperature steam calcined at temperatures from about 1000 to about 1200° F. and do not undergo the rapid heating in the high temperature calcination step as the BAY zeolites of the present invention.

It has been discovered that it is important in achieving the EMY zeolite structure that the zeolite precursor be brought up close to the desired steaming temperature in a very rapid manner. The temperature of the zeolite during the steaming process may be measured by a thermocouple implanted into the bed of the EMY zeolite precursor.

In a preferred embodiment of making the EMY zeolite, the temperature of the zeolite is raised from a standard pre-calcination temperature to within 50° F. (27.8° C.) of the steam temperature during the high temperature steam calcination step in less than about 5 minutes. In a more preferred embodiment of making the EMY zeolite, the temperature of the zeolite is raised from a standard pre-calcination temperature to within 50° F. (27.8° C.) of the steam temperature during the high temperature steam calcination step in less than about 2 minutes. Although not critical to the fabrication process and not so limited as to the claimed invention herein, typically the pre-calcination temperature in a Y-type zeolite manufacturing process is from about 50° F. to about 300° F.

Figure 3:
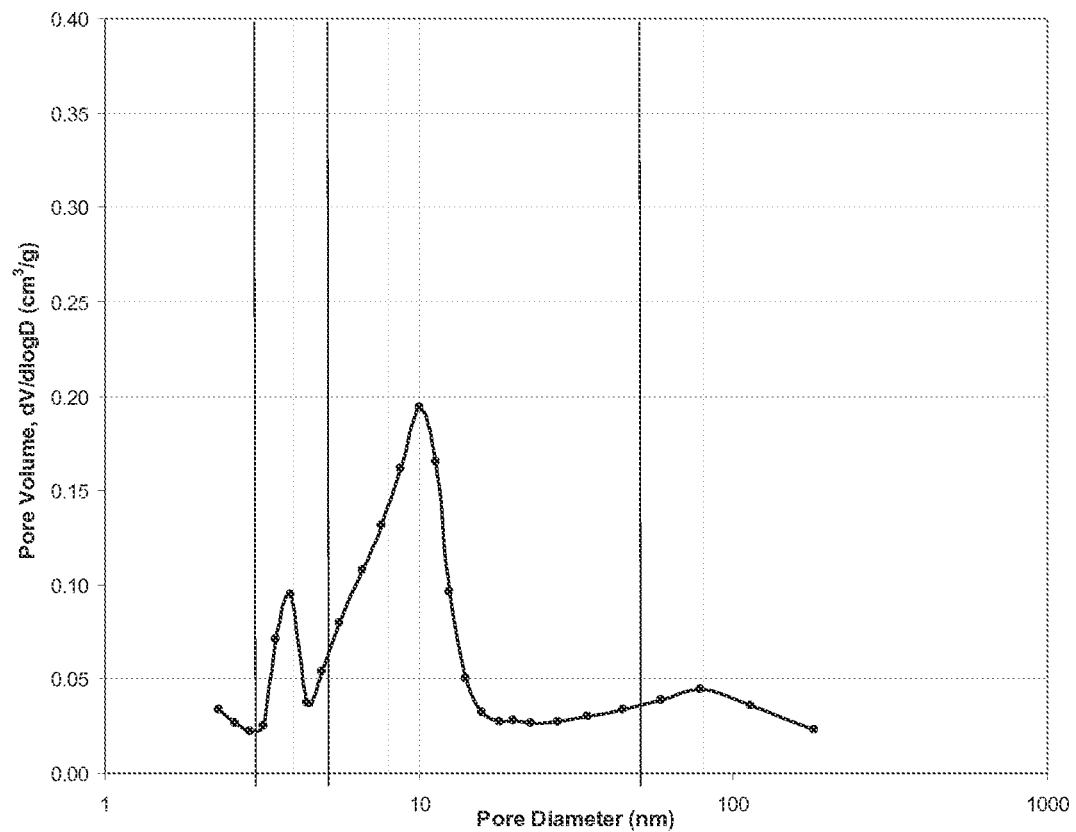
FIG. 3 is a BJH N$_2$ Desorption Plot of an embodiment of an Extra Mesoporous Y ("EMY") zeolite as utilized in the catalysts of the present invention.

Example 2 herein describes the synthesis of one embodiment of an Extra Mesoporous Y ("EMY") zeolite. FIG. 3 shows the BJH $N_2$ Desorption Plot of the EMY zeolite sample from Example 2 prior to additional ammonium exchange and long-term deactivation steaming. As can be seen in FIG. 3, the EMY zeolite exhibits a very low volume of pores in the "small mesoporous" range (30 to 50 Å pore diameter) as well as a very low "small mesopore peak" of about 0.09 $cm^3/g$ in this small mesopore range. In comparing FIG. 1 (USY zeolite) and FIG. 3 (EMY zeolite) it should be noted that this "small mesopore peak" has been substantially depressed in the EMY zeolite. It can be seen in FIG. 1 that this small mesopore peak is about 0.20 $cm^2/g$ for the USY as compared to the small mesopore peak of about 0.09 $cm^3/g$ for the EMY as shown in FIG. 3.

As can further be seen in FIG. 3, there is beneficially a significant "large mesopore peak" associated mainly with the large mesoporous structures (50 to 500 Å pore diameter range) of the EMY zeolite. Comparing this to the BJH $N_2$ Desorption Plot of the USY zeolite in FIG. 1, it can be seen that the EMY zeolite in FIG. 3 exhibits a significant large mesopore peak of about 0.19 $cm^3/g$ whereas the USY zeolite in FIG. 1 shows no significantly comparable large mesopore peak in this range.

The pore volumes in each of the ranges, 30 to 50 Angstroms as well as 50 to 500 Angstroms were determined by utilizing the pore volume data from the BJH $N_2$ Desorption tests and interpolating the data to the necessary endpoints. This method for calculating the pore volumes is explained in detail in Example 1 and the same method for calculating the pore volumes was utilized throughout all examples herein. The method as described therein defines how to interpret and calculate the pore volume values of the zeolites within each of the defined pore diameter ranges.

The "small mesopore" and "large mesopore" pore volumes and the BET surface areas for the USY and EMY zeolites of FIGS. 1 and 3, respectively, were measured and are shown in Table 1 as follows:

TABLE 1

Zeolite Properties prior to Long-Term Steaming

| Zeolite | Small (30-50 Å) Mesopore Volume ($cm^3/g$) | Large (50-500 Å) Mesopore Volume ($cm^3/g$) | Large-to-Small Pore Volume Ratio | Small Mesopore Peak, dV/dlogD ($cm^3/g$) | BET Surface Area ($m^2/g$) | Unit Cell Size (Å) |
|---|---|---|---|---|---|---|
| USY (FIG. 1) | 0.0193 | 0.0195 | 1.01 | 0.20 | 811 | 24.55 |
| EMY (FIG. 3) | 0.0109 | 0.0740 | 6.79 | 0.09 | 619 | 24.42 |

It should be noted that FIGS. 1 and 3, as well as the data in Table 1, reflect the USY and EMY zeolite samples after the high temperature steam calcination step and prior to any subsequent treating. As can be seen in Table 1, the volume of small mesopores is larger in the USY zeolite than in the EMY zeolite. However, it can also be seen that the volume of large mesopores in the EMY zeolite is significantly larger than the volume of large mesopores in the USY zeolite. As discussed, it is desired to lower the amount of pore volume in the small mesopore range and increase the amount of pore volume in the large mesopore range of the zeolite. Therefore, an important characteristic of the zeolite is the ratio of the large mesopore volume ("LMV") to the small mesopore volume ("SMV") of the subject zeolite. We term this ratio of the LMV:SMV as the "Large-to-Small Pore Volume Ratio" or "LSPVR" of the zeolite.

As can be seen from Table 1, the Large-to-Small Pore Volume Ratio or "LSPVR" of the sample USY zeolite is about 1.01 wherein the LSPVR of the sample EMY zeolite is about 6.79. This is a significant shift in the Large-to-Small Pore Volume Ratio obtained by the present invention. In a preferred embodiment, the LSPVR of the EMY is at least about 4.0, more preferably at least about 5.0, and even more preferably, the LSPVR of the EMY is at least about 6.0 immediately after the first high temperature steam calcination step as described herein.

Additionally, the EMY zeolites of the present invention may be used in processes that are not subject to exposure to high temperature hydrothermal conditions. It can be seen from Table 1, that one of the remarkable aspects of the EMY zeolites of the present invention is that they exhibit very high Large Mesopore Volumes as compared to the comparable USY of the prior art. This characteristic of the EMY zeolites of the present invention can be valuable to many commercial processes. In preferred embodiments, the as-fabricated EMY zeolites of the present invention have a Large Mesopore Volume of at least 0.03 $cm^3/g$, more preferably at least 0.05 $cm^3/g$, and even more preferably at least 0.07 $cm^3/g$.

As utilized herein, the term "as-fabricated" or "as-fabricated zeolite" of the present invention is defined as the zeolite and its properties as obtained directly after the high temperature steam calcination step (i.e., when the EMY zeolite is formed). As one of skill in the art will be aware, subsequent additional steps (e.g., further ion-exchange) can be performed on the zeolite after forming What is considered the EMY zeolite herein. Unless otherwise stated herein or in the claims, the zeolite properties are measured and defined herein as of this "as-fabricated" point in the fabrication process. As is known to one of skill in the art, the "long-term deactivation steaming" referred to herein is generally utilized as a tool to test the ability of the as-fabricated zeolite to withstand hydrothermal conditions and is not considered as a part of the fabrication of the zeolite.

It should also be noted that it is obvious to those of skill in the art that long-term deactivation steaming will tend to increase the Large Mesopore Volume of typical Y zeolites. However, this unusual aspect of the EMY zeolites of the present invention of possessing such a significantly increased Large Mesopore Volume prior to long-term deactivation steaming can be useful in processes wherein high temperature hydrothermal conditions are not present or even more importantly in processes wherein it is undesired for the fabricated zeolite to be long-term steam deactivated. The as-fabricated EMY zeolite possesses higher BET surface areas as compared to the BET surface areas after the log-term steam deactivation and the as-fabricated EMY zeolite may be more stable in some applications than that the EMY zeolite Obtained after long-term steam deactivation.

It can also be seen from comparing FIG. 1 (USY zeolite sample) and FIG. 3 (EMY zeolite sample) that the small mesopore peak in the 30 to 50 Å pore diameter range is significantly lower for the EMY zeolite than the USY zeolite. In a preferred embodiment, the as-fabricated EMY zeolite obtained following the high temperature steam calcination exhibits a Small Mesopore Peak of less than about 0.15 $cm^3/g$. In a more preferred embodiment, the EMY zeolite has a Small Mesopore Peak of less about 0.13 $cm^3/g$, and in an even more preferred embodiment, the Small Mesopore Peak of the EMY is less than about 0.11 $cm^3/g$. The Small Mesopore Volume Peak as defined prior is the maximum value (or peak) of the pore volume value (dV/dlogD, y-axis) exhibited on the BJH $N_2$ Desorption Plot in the 30 to 50 Angstroms (Å) pore diameter range.

In addition, the EMY materials of the present invention exhibit smaller unit cell sizes as compared to similar USY materials that have undergone a single high temperature steam calcination step. As can be seen in Table 1, the USY zeolite of Example 1 has a unit cell size of about 24.55 Å, while the EMY zeolite prepared from similar starting materials has a significantly tower unit cell size of about 24.42 Å.

It has been discovered that in preferred embodiments, these as-fabricated EMY zeolites exhibit unit cell sizes that are less than 24.45 Å. Preferably, the as-fabricated EMY zeolites exhibit unit cell sizes ranging from about 24.37 to about 24.47 Å after the first high temperature steam calcination step as described herein. In even more preferred embodiments, the as-fabricated EMY zeolites have low unit cells size from about 24.40 to about 24.45 Å after the first high temperature steam calcination step as described herein. This smaller unit cell size generally results in a more stable zeolite configuration due to the higher framework silica/alumina ratios reflected by the lower unit cell sizes of EMY zeolite.

The USY zeolite sample as described in Example 1 and shown in the BJH $N_2$ Desorption Plot of FIG. 1 as well as the EMY zeolite sample as described in Example 2 and shown in the Bill $N_2$ Desorption Plot of FIG. 3 were further ammonium ion-exchanged and then long-term deactivation steamed at 1400° F. for 16 hours to determine the long-term hydrothermal stability of the USY and EMY zeolites.

Figure 4:
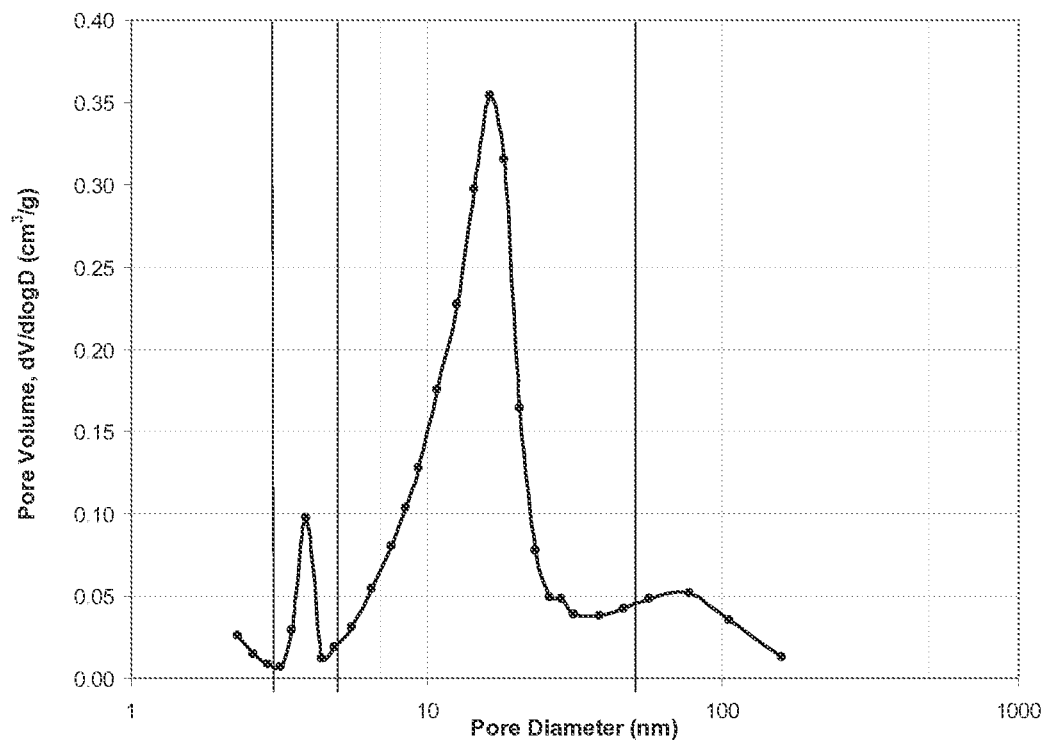
FIG. 4 is a BJH N$_2$ Desorption Plot of an embodiment of an Extra Mesoporous Y ("EMY") zeolite after it has been subjected to ion-exchange/calcination steps and long-term deactivation steaming at 1400° F. for 16 hours.

FIG. 2 shows the BJH $N_2$ Desorption Plot of the ion-exchanged USY zeolite of the prior art after long-term deactivation steaming. FIG. 4 shows the BJH $N_2$ Desorption Plot of the ion-exchanged EMY zeolite of an embodiment of the present invention after long-term deactivation steaming. As can be seen from FIG. 4, the Large Mesopore Peak of the EMY zeolite increased desirably from about 0.19 $cm^3/g$ (as shown in FIG. 3) to about 0.36 $cm^3/g$ (as shown in FIG. 4) after long-term deactivation steaming. Just as desirable, following long-term deactivation steaming of the EMY zeolite, the Small Mesopore Peak of the EMY zeolite was not significantly increased. The Small Mesopore Peak of the EMY zeolite remained essentially constant at about 0.10 $cm^2/g$ (as shown in FIGS. 3 and 4).

In contrast, in the comparative USY zeolite of the prior art, the Small Mesopore Peak remained undesirably high at about 0.19 $cm^3/g$ after long-term deactivation steaming (see FIG. 2).

The physical properties of the zeolites obtained after long-term deactivation steaming in Examples 1 and 2 are tabulated in Table 2 below. In Table 2 below, are shown the "Small Mesopore Volumes", the "Large Mesopore Volumes, the "Large-to-Small Pore Volume Ratios", and the Small Mesopore Peaks" for the USY and EMY zeolites illustrated in FIGS. 2 and 4, respectively, as well as the associated BET surface areas and the unit cell sizes as measured following three ammonium ion-exchanges and long-term deactivation steaming at 1400° F. for 16 hours.

TABLE 2

Zeolite Properties after Long-Term Deactivation Steaming

| Zeolite | Small (30-50 Å) Mesopore Volume (cm³/g) | Large (50-500 Å) Mesopore Volume (cm³/g) | Large-to-Small Pore Volume Ratio | Small Mesopore Peak, dV/dlogD (cm³/g) | BET Surface Area (m²/g) | Unit Cell Size (Å) |
|---|---|---|---|---|---|---|
| USY (FIG. 2) | 0.0112 | 0.1211 | 10.85 | 0.19 | 565 | 24.27 |
| EMY (FIG. 4) | 0.0077 | 0.1224 | 15.97 | 0.10 | 587 | 24.27 |

Another benefit of the EMY zeolites of the present invention is surface area stability. As can be seen in Table 2, the BET surface area for the tong-term deactivation steamed EMY zeolite sample was greater than the BET surface area for the USY sample. Additionally, the EMY retained a higher percentage of the surface area after the three ammonium ion exchanges and long-term deactivation steaming at 1400° F. for 16 hours. Comparing Table 1 and Table 2, the USY retained about 70% of its original surface area wherein the EMY retained about 95% of its original surface area, indicating the superior hydrostability of the EMY zeolites of the present invention, in preferred embodiments of the present invention, the EMY zeolite has BET Surface Area of at least 500 m²/g as measured either before long-term deactivation steaming at 1400° F. for 16 hours or after long-term deactivation steaming at 1400° F. for 16 hours.

In a preferred embodiment, the "Large-to-Small Pore Volume Ratio" (or "LSPVR") of the EMY is at least about 10.0, more preferably at least about 12.0, and even more preferably, the LSPVR of the EMY is at least about 15.0 after long-term deactivation steaming at 1400° F. for 16 hours.

In preferred embodiments of the hydrocracking catalysts herein, the EMY zeolite is incorporated with a binder material to impart resistance to the temperatures and other conditions employed in the hydrocarbon conversion processes as well as to enable the catalyst to be formed into catalyst particles of suitable size and stability for the hydrocracking process apparatus and process conditions. In these preferred catalyst embodiments, the EMY zelolite herein is incorporated into a catalyst by the use of a suitable binder material. Suitable binder materials include materials selected from metal oxides, zeolites, aluminum phosphates, polymers, carbons, and clays. Most preferable, the binder is comprised of at least one metal oxide, preferably selected from silica, alumina, silica-alumina, amorphous aluminosilicates, boron, titania, and zirconia. Preferably, the binder is selected from silica, alumina, and silica-alumina. In a preferred embodiment, the binder is comprised of pseudoboehmite alumina.

While the catalysts of invention can contain from 0 to 99 wt % binder materials, in preferred embodiments, the binders levels can be about 25 to about 80 wt %, more preferably, from about 35 to 75 wt %, or even from about 50 to about 65 wt % of the overall final hydrocracking catalyst. In other preferred embodiments, the hydrocracking catalyst can be less than 80 wt %, more preferably less than 75 wt %, and most preferably less than 65 wt % or even 50 wt % binder materials.

In other preferred embodiments, the hydrocracking catalyst may contain additional zeolites or molecular sieves. In a preferred embodiment, the hydrocracking catalyst further comprises at least one of the following zeolites or molecular sieves. In a preferred embodiment, the hydrocracking catalyst further comprises at least one of the following molecular sieves: beta, ZSM-5, ZSM-11, ZSM-57, MCM-22, MCM-49, MCM-56, ITQ-7, ITQ-27, ZSM-48, mordenite, zeolite L, ferrierite, ZSM-23 MCM-68, SSZ-26/-33, SAPO-37, ZSM-12, ZSM-18, and EMT faujasites. In more preferred embodiments, the hydrocracking catalyst comprises at least one of the following molecular sieves: beta, ZSM-5, LSM-48, mordenite, and zeolite L. The molecular sieves listed above can be present in the as-synthesized form, or alternatively, can be post-modified chemically, thermally, or mechanically to create a stabilized form of the material.

In preferred embodiments, the hydrocracking catalyst of the invention herein contains the EMY zeolite in an amount of at least 10 wt %, more preferably at least at least 25 wt %, and even more preferably at least 35 wt % or even at least 50 wt % based on the finished catalyst, particularly when a binder is utilized.

In preferred embodiments of the hydrocracking catalyst, the aggregates of zeolite Y (Meso-Y) are combined with at least one metal oxide binder (as described prior) and further with at least one hydrogenating metal component, in order to form a catalyst suitable for hydrocracking. Examples of such hydrogenating metal components can include one or more noble metals or one or more non-noble metals.

The aggregates of zeolite Y, binder and additional components may be extruded, spray-dried, or otherwise shaped into a catalyst particle for use in hydroconversion processes described herein. In preferred embodiments of the hydrocracking catalysts herein, the final catalyst contains an active Group 6 and/or Group 8/9/10 metal. Please note that the designation of Group 6 and Group 8/9/10 herein corresponds to the modern IUPAC designation wherein the columns of the Periodic Table of Elements corresponds to columns numbered 1 through 18. A "Group 6" metal as designated herein corresponds to any metal in Column 6 of the modern IUPAC designated Periodic Table of Elements and which corresponds to the old designation of "Group VIA" as shown in the Periodic Table of Elements, published by the Sargent-Welch Scientific Company, 1979, wherein the Group 6 (old "Group VIA") elements include the column from the periodic table of elements containing Cr, Mo, and W. Similarly, a "Group 8/9/10" metal as designated herein corresponds to any metal in Columns 8, 9 or 10 of the modern IUPAC designated Periodic Table of Elements and which corresponds to the old designation of "Group VIIIA" as shown in the Periodic Table of Elements, published by the Sargent-Welch Scientific Company, 1979, wherein the Group 8/9/10 (old "Group VIIIA") elements include the columns from the periodic table of elements containing Fe, Co, Ni, Ru, Rh, Pd, Os, Ir, and Pt.

In a preferred embodiment, the hydrocracking catalyst is comprised of at least one Group 6 metal selected from Mo and W, and at least one Group 8/9/10 metal selected from Ni and Co. In a preferred embodiment, the Group 6 metal is Mo and the Group 8/9/10 metal is Co. In another preferred embodiment, the hydrocracking catalyst is comprised at least one Group 8/9/10 metal selected from Pt, Pd, Rh and Ru (noble metals). In another preferred embodiment, the hydrocracking catalyst is comprised at least one Group 8/9/10 metal selected from Pt and Pd. In another preferred embodiment, the hydrocracking catalyst is comprised of Pt. The active Group 6 or Group 8/9/10 metals may be incorporated into the catalyst by any technique known in the art. A preferred technique for active metal incorporation into the catalyst herein is the incipient wetness technique.

The amount of active metal in the catalyst can be at least 0.1 wt % based on catalyst, or at least 0.15 wt %, or at least 0.2 wt %, or at least 0.25 wt %, or at least 0.3 wt %, or at least 0.5 wt % based on the catalyst. For embodiments where the Group 8/9/10 metal is Pt, Pd, Rh, Ru, or a combination thereof, the amount of active metal is preferably from 0.1 to 5 wt %, more preferably from 0.2 to 4 wt %, and even more preferably from 0.25 to 3.5 wt %. For embodiments where the active metal is a combination of a non-noble Group 8/9/10 non-noble metal with a Group 6 metal, the combined amount of active metal is preferably from 0.25 wt % to 40 wt %, more preferably from 0.3 wt % to 35 wt %, and even more preferably from 1 wt % to 25 wt %.

Other preferred non-noble metals and non-noble metal combinations utilized in the hydrocracking catalysts herein can include chromium, molybdenum, tungsten, cobalt, nickel, and combinations thereof, such as cobalt-molybdenum, nickel-molybdenum, nickel-tungsten, cobalt-tungsten, cobalt-nickel-molybdenum, cobalt-nickel-tungsten, nickel-molybdenum-tungsten, and cobalt-molybdenum-tungsten. Non-noble metal components may be pre-sulfided prior to use by exposure to a sulfur-containing gas (such as hydrogen sulfide) or liquid (such as a sulfur-containing hydrocarbon stream, e.g., derived from crude oil and/or spiked with an appropriate organosulfur compound) at an elevated temperature to convert the oxide form to the corresponding sulfide form of the metal.

The present invention also includes a method of making the hydrocracking catalysts described herein. A preferred method of making an embodiment of the catalysts herein comprises the steps of mixing a binder precursor selected from a silica, an alumina, or a combination thereof to form a catalyst mixture; and drying the catalyst mixture to form a catalyst; wherein the zeolite is a Y zeolite with a Large Mesopore Volume of at least about 0.03 cm$^3$/g and a Small Mesopore Peak of less than about 0.15 cm$^3$/g (i.e., an embodiment of an EMY zeolite). In preferred embodiment, the binder precursor is a colloidal silica, silica gel, a silica sol, or a combination thereof. In preferred embodiment, the binder precursor is a colloidal alumina, alumina gel, a alumina sol, or a combination thereof.

Most preferred embodiments of the low mesoporous peak catalysts and method of making the low mesoporous peak catalysts of the present invention include combinations of some or all of the most preferred embodiments of the EMY zeolites and catalysts described herein.

In preferred embodiments, the hydrocracking catalyst materials herein (including the zeolite and binder materials) can be formed into a paste utilizing the components as described herein as well as are exemplified as described in the examples herein. The paste can then be extruded into catalyst pellets. In preferred embodiments, the extruded catalyst pellets are further dried as about 150 to about 300° F. (66 to about 149° C.) and then are further air calcined at about 600 to about 1200° F. (316 to about 649° C.). In other embodiments, the hydrocracking catalyst can formed by spray drying the catalyst mixture at a temperature from about 250° F. to about 650° F. (121 to about 343° C.), which can then be further optionally air dried and calcined.

The active metals (such as, but not limited to, the Group 6 and/or Group 8/9/10 metals as described herein) are preferably added to the formed catalyst pellets after drying and/or calcining Preferably, the active metals are added to the formed catalyst pellets by incipient wetness technique.

The embodiments of the hydrocracking catalysts described herein are utilized in processes for conversion of heavy hydrocarbon feedstocks into lighter, more valuable hydrocarbon products (such, as gasoline, kerosene, and diesel products). The catalysts herein have been unexpectedly found to possess very high selectivities toward diesel production (i.e., increased yield volumes) when utilized under hydrocracking conditions. As is well, known, increased diesel production is a main focus of refineries in the United States and even more particularly in the markets of Europe and Asia), as the vehicle pool is ever shifting more toward higher mileage diesel powered vehicles as compared to less efficient gasoline powered engines.

In these hydrocracking processes, the hydrocarbon feedstock to be hydrocracked may include, in whole or in part, a gasoil (e.g., light, medium, heavy, vacuum, and/or atmospheric) having an initial boiling point above about 400° F. (204° C.), a T50 boiling point (i.e., the point at which approximately 50 percent by weight boils, or becomes or is gaseous, under atmospheric pressure) of at least about 600° F. (316° C.), and an end boiling point of at least about 750° F. (399° C.). However, as noted, the hydrocracking catalysts of invention are particularly useful in maximizing diesel production (400° F. to 700° F., i.e. 204-371° C., boiling range products) from higher boiling point feedstocks. As such, in preferred embodiments of the present invention, the hydrocarbon feedstock contains at least 25 wt %, more preferably at least 50 wt %, and even more preferably, at least 75 wt % hydrocarbons with boiling points above 750° F. (399° C.). In preferred embodiments, it is preferred that the portion the hydrocarbon feedstock boiling above 750° F. (399° C.) has a T50 boiling point above 800° F. (427° C.), more preferably above 825° F. (441° C.), and most preferably above 850° F. (454° C.).

The feedstock can include one or more of thermal oils, residual oils, cycle stocks, whole top crudes, partial crudes, tar sand oils, shale oils, synthetic fuels, heavy hydrocarbon fractions derived from the destructive hydrogenation of coal, tar, pitches, and/or asphalts, hydrotreated feedstocks derived therefrom, and the like. As should be appreciated by those skilled in the art, the distillation of higher boiling petroleum fractions above about 750° F. (399° C.) can generally be carried out under vacuum (i.e., at subatmospheric pressure), typically to avoid thermal cracking. The boiling temperatures utilized herein are thus conveniently expressed in terms of the boiling point corrected to atmospheric pressure. Further additionally or alternately, resid compositions and/or deeper cut gasoils, such as with relatively high metals contents, can be cracked using catalysts employing the aggregated zeolite materials of the invention.

In such processes envisioned utilizing the hydrocracking catalysts of invention herein, a hydrocarbon feedstock is contacted with embodiments of the hydrocracking catalysts disclosed and described herein under hydrocracking conditions. In the processes herein, it is desired to maximize the amount of diesel product (i.e., hydrocarbon with boiling points in the range of 400 to 700° F., also referred to as the "400-700° F. Yield" or "Distillate Yield") produced in the hydrocracking conversion process. Similarly, it is desired that the "Distillate Selectivity" of a hydrocracking catalyst is also high. The "Distillate Selectivity" is defined as the Distillate Yield divided by the "700° F.+ Conversion" (or simply "conversion") herein. The "700° F.+ Conversion" is the wt % of the hydrocarbon product from the process that boils below 700° F. divided by the wt % of the hydrocarbon feed from the process that boils above 700° F. The Distillate Selectivity is an important measurement since although a high 700° F.+ Conversion is desired, it is desired that a high amount of the converted product is in the distillate range and not cracked into lighter, less valuable products. As such, the Distillate Selectivity is an important measurement of the catalysts' performance.

The contacting of the hydrocarbon feedstock with the Y-containing hydrocracking catalysts is typically performed in a hydrocracker reactor in the presence of excess hydrogen gas. The hydrocracking process may contain one or more reactor stages in series, but most preferably, there are either one or two reactor stages, but each stage may contain one or more reactor vessels. In preferred embodiments of the present invention, there are at least two reactor stages, with the first reactor stage being operated at a total pressure of at least 250 psig, more preferably at least 500 psig, higher than the second reactor stage. Even more preferably, hydrocracking process comprises an intermediate vapor separation between the first reactor stage and the second reactor stage in which at least a portion of the hydrogen gas from the first reactor stage effluent is removed. In more preferred embodiments, at least a portion of the hydrogen gas removed in the intermediate vapor separation step is recycled to the first reactor stage.

Preferred hydrocracking operating conditions herein include a reaction temperature from about 550° F. (about 288° C.) to about 800° F. (about 427° C.); a total pressure from about 300 psig (about 2.1 MPag) to about 3000 psig (about 20.7 MPag), more preferably from about 700 psig (about 4.8 MPag) to about 2500 psig, (about 17.2 MPag); an LHSV from about 0.1 hr$^{-1}$ to about 20 hr$^{-1}$, preferably from about 0.2 hr$^{-1}$ to about 10 hr$^{-1}$; and a hydrogen treat gas rate from about 500 scf/bbl (about 85 Nm$^3$/m$^3$) to about 10000 scf/bbl (about 1700 Nm$^3$/m$^3$), preferably from about 750 scf/bbl (about 130 Nm$^3$/m$^3$) to about 7000 scf/bbl (about 1200 Nm$^3$/m$^3$), more preferably from about 1000 scf/bbl (about 170 Nm$^3$/m$^3$) to about 5000 scf/bbl (about 850 Nm$^3$/m$^3$).

Figure 5:
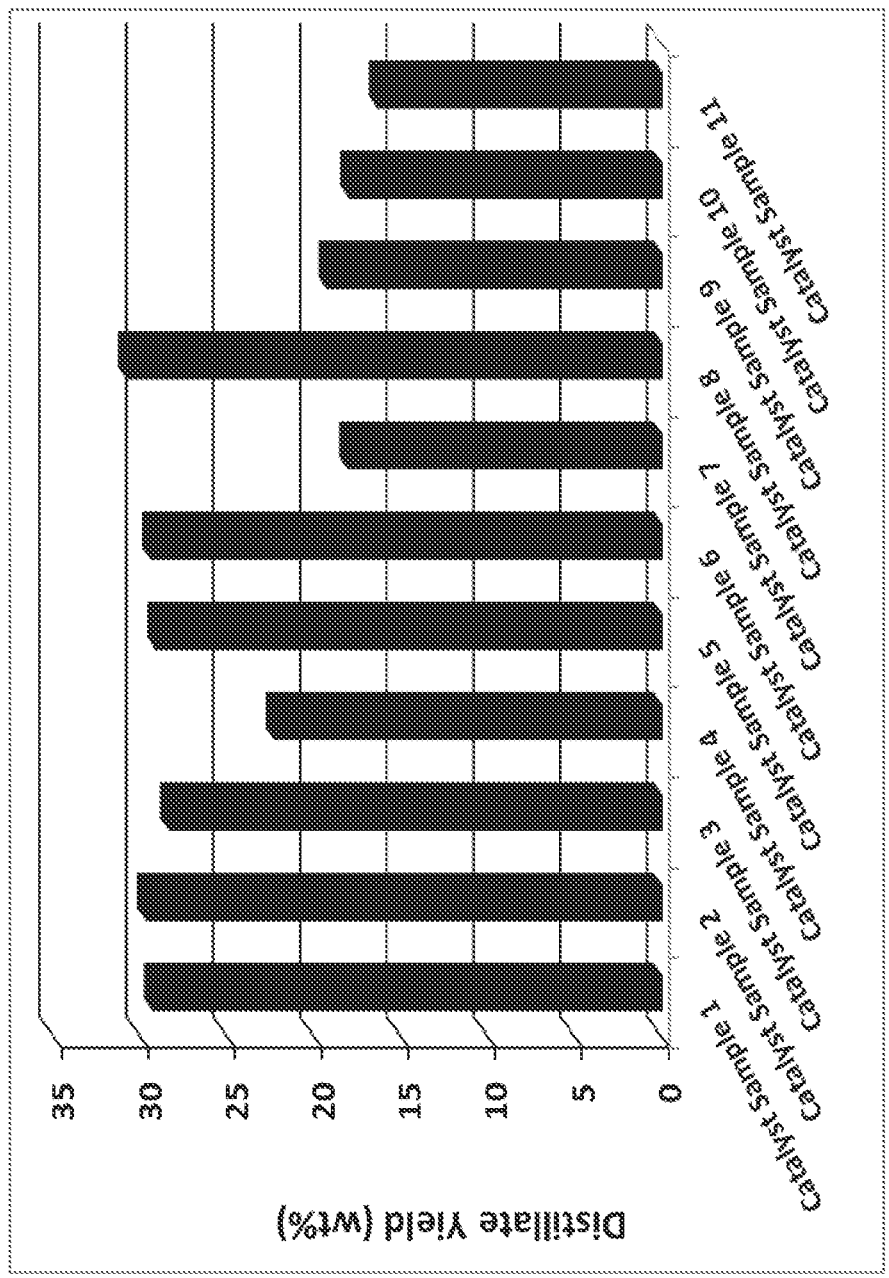
FIG. 5 shows the distillate product yields from the comparative hydrocracking testing data from the "batch unit" high-throughput testing of Example 3.
Figure 6:
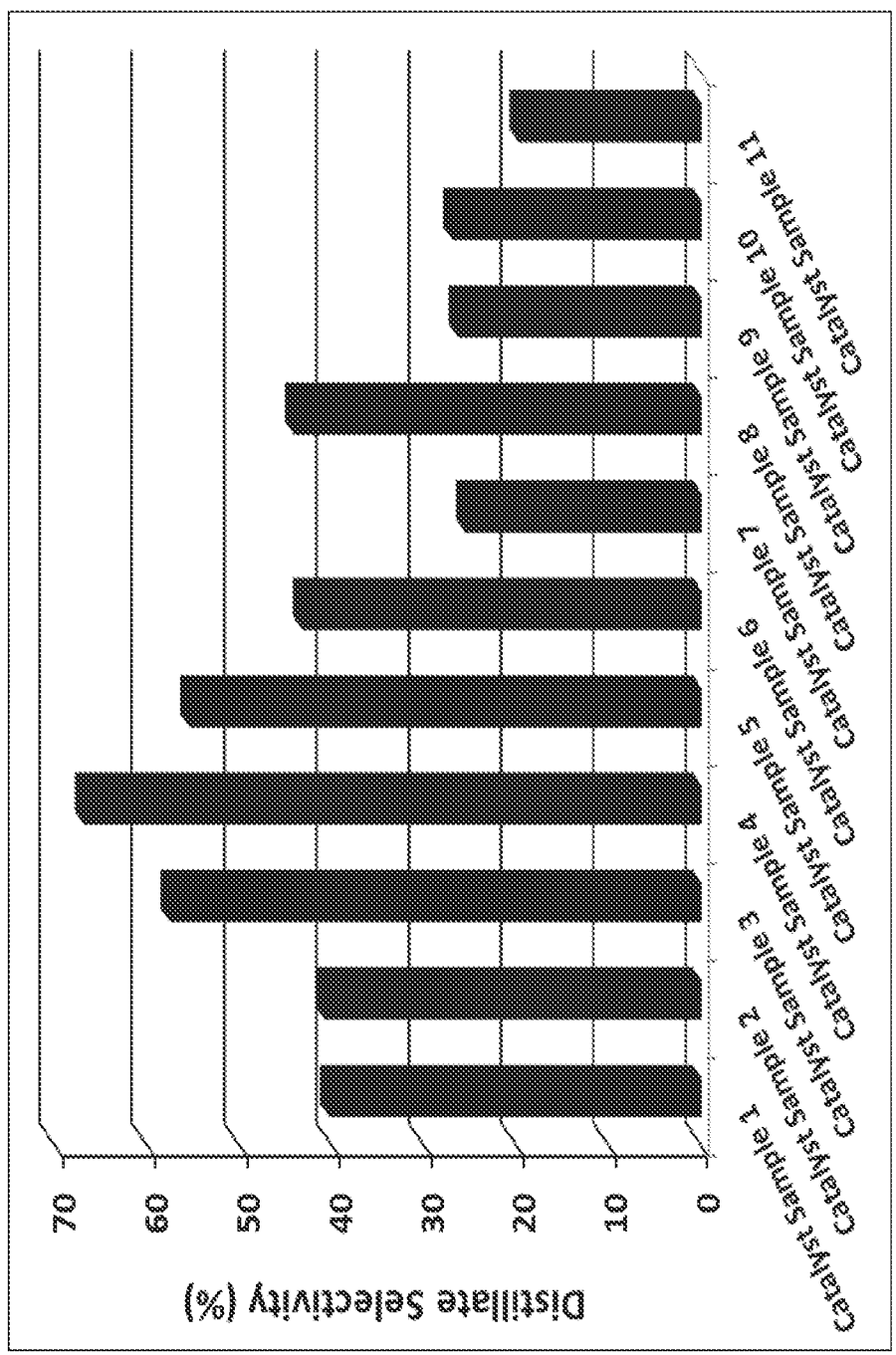
FIG. 6 shows the distillate product selectivities from the comparative hydrocracking testing data from the "batch unit" high-throughput testing of Example 3.

FIGS. 5 and 6 herein show the results of the "batch unit" testing described in Example 4 including the four (4) EMY hydrocracking catalyst samples of the present invention (Catalyst Samples 1-4) compared with the seven (7) USY reference catalysts from Example 3.

As can be seen in FIG. 5, the Distillate Yields are shown for all eleven (11) catalysts. As discussed prior, the "Distillate Yield" is the weight percentage of the hydrocarbon product from the testing that boils in the range of from 400-700° F. Here, three of the four EMY hydrocracking catalysts of invention (Catalyst Samples 1-3) show Distillate Yields at are above the best performing reference hydrocracking catalysts.

However, more importantly, in FIG. 6, the Distillate Selectivities are shown for all eleven (11) catalysts tested in the batch unit. Here, it can be seen that while all four EMY catalysts (Catalyst Samples 1-4) had very high Distillate Selectivities, that two of the EMY hydrocracking catalysts of invention (Catalyst Sample 3 and 4), significantly outperformed all of the reference catalysts for Distillate Selectivity.

Figure 7:
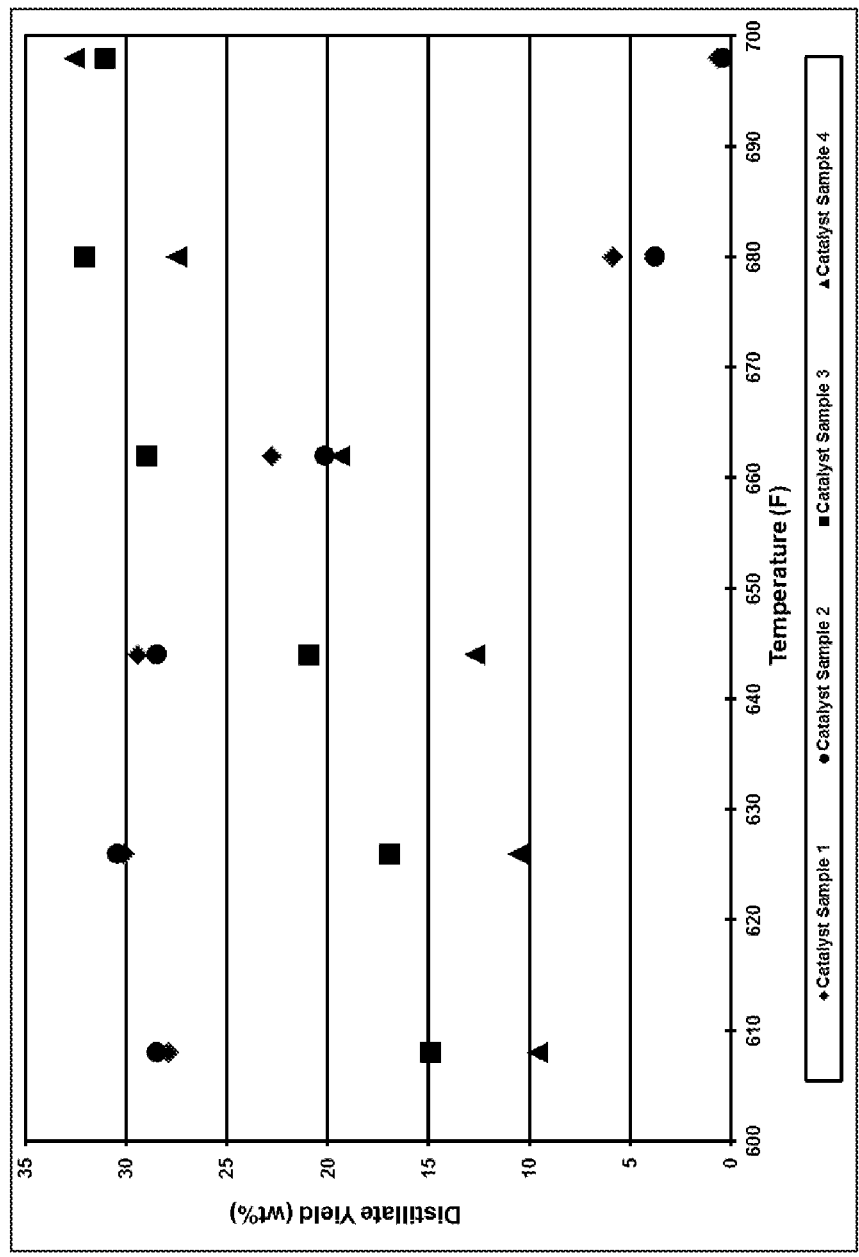
FIG. 7 shows the distillate product yields from the comparative hydrocracking testing data from the "flow unit" high-throughput testing of Example 3.
Figure 8:
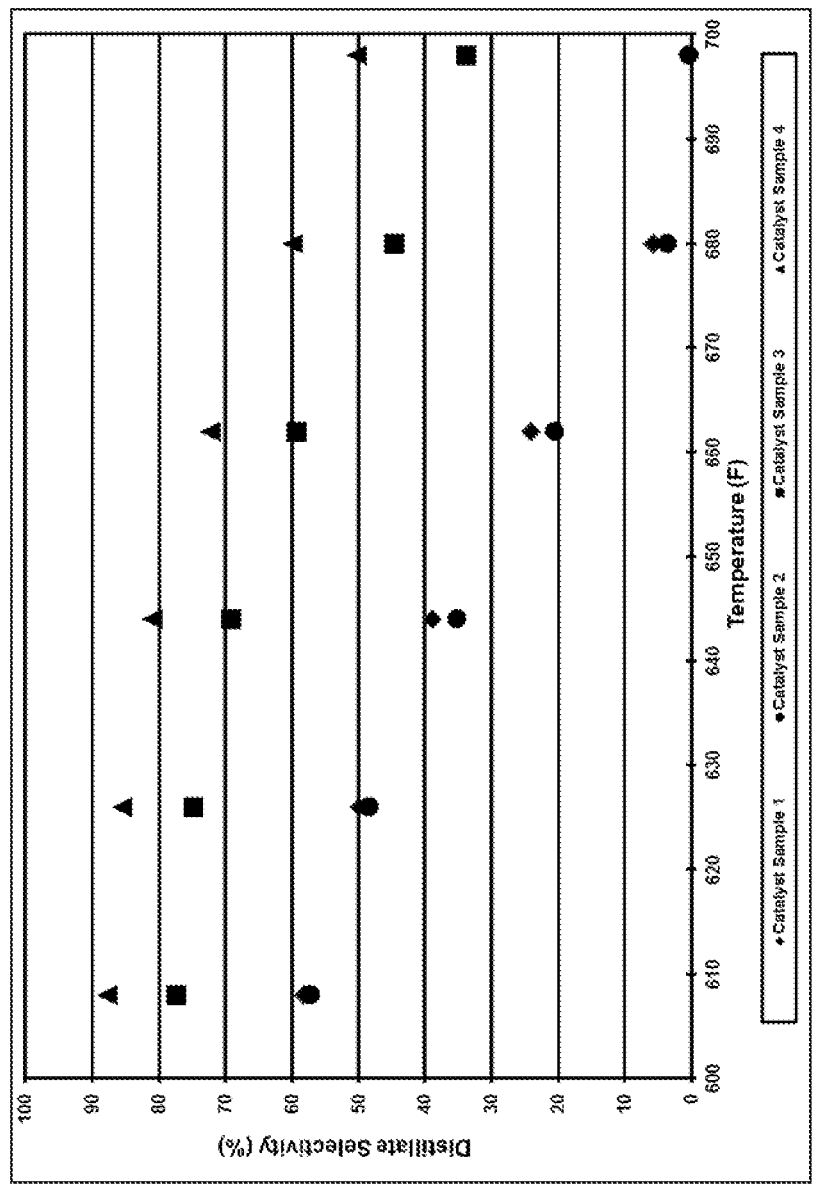
FIG. 8 shows the distillate product selectivities from the comparative hydrocracking testing data from the "flow unit" high-throughput testing of Example 3.

FIGS. 7 and 8 herein show the results of the "flow unit" testing described in Example 4 of the four (4) EMY hydrocracking catalyst samples of the present invention (Catalyst Samples 1-4).

In FIG. 7, it can be seen EMY Catalyst Samples 1 and 2 of the present invention have better Distillate Yields at lower hydrocracking temperatures, while the EMY Catalyst Samples 3 and 4 of the present invention have better distillate yields at higher hydrocracking temperatures. This allows the EMY catalysts of the present invention to be tailor designed to the operating conditions of a specific hydrocracking unit or process.

In FIG. 8, it can be seen EMY Catalyst Samples 3 and 4 of the present invention have better Distillate Selectivities at all hydrocracking temperatures than the EMY Catalyst Samples 1 and 2 of the present invention have better distillate yields at higher hydrocracking temperatures. Therefore, if distillate selectivity is the primary desired component from the hydrocracking process, the versions of the EMY Catalyst Samples 3 and 4 can be utilized. It should be noted here that the superior Distillate Selectivities of EMY Catalyst Samples 3 and 4 from the flow unit testing (as shown in FIG. 8) coincide with the showing of superior Distillate Selectivities of EMY Catalyst Samples 3 and 4 from the batch unit testing (as shown in FIG. 6).

Although the present invention has been described in terms of specific embodiments, it is not so limited. All suitable combinations and sub-combinations of preferred characteristics of the catalysts presented herein are contemplated by the present invention. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the manner in which the zeolites and hydrocracking catalysts of the current invention were synthesized and tested, as well as illustrate the improved product qualities and the benefits from specific embodiments of the current invention thus obtained. These Examples only illustrate specific embodiments of the present invention and are not meant to limit the scope of the current invention.

EXAMPLES

Example 1

A commercial ammonium-exchanged Y zeolite with a low sodium content (CBV-300® from Zeolyst™, SiO$_2$/Al$_2$O$_3$ molar ratio=5.3, Na$_2$O 3.15 wt % on dry basis) was steamed in a horizontal calcination oven which was at a temperature of 1000° F. and in a flow of 50% steam+50% N$_2$ for 1 hour. The resulting product was an ultra-stable Y (USY) zeolite, and was analyzed with a Micromeritics® Tristar 3000® analyzer to determine the pore size distribution characteristics by nitrogen adsorption/desorption at 77.35° K. The BJH method as described in the specification was applied to the N$_2$ adsorption/desorption isotherms to obtain the pore size distribution of the zeolite, and a plot of dV/dlogD vs. Average Pore Diameter is shown in FIG. 1.

A copy of the pertinent data generated by the BJH method generated from the N$_2$ adsorption/desorption isotherms for this zeolite sample is reproduced in Table 3 below. This test method and the associated format of data generated as presented are familiar to one of skill in the art.

TABLE 3

BJH Pore Volume Distribution of USY Sample

| Pore Diameter Range (nm) | Average Diameter (nm) | dV/dlogD Pore Volume (nm) | Cumulative Pore Volume (cm$^3$/g) | Incremental Pore Volume (cm$^3$/g) |
|---|---|---|---|---|
| 312.8-104.1 | 124.1 | 0.010 | 0.0048 | 0.0048 |
| 104.1-62.8 | 73.6 | 0.017 | 0.0085 | 0.0037 |
| 62.8-41.5 | 47.8 | 0.018 | 0.0117 | 0.0032 |
| 41.5-30.4 | 34.1 | 0.018 | 0.0142 | 0.0024 |
| 30.4-22.9 | 25.5 | 0.017 | 0.0162 | 0.0020 |
| 22.9-18.6 | 20.3 | 0.015 | 0.0175 | 0.0014 |
| 18.6-16.8 | 17.6 | 0.016 | 0.0182 | 0.0007 |
| 16.8-15.0 | 15.8 | 0.014 | 0.0189 | 0.0007 |
| 15.0-13.2 | 14 | 0.0152 | 0.0198 | 0.0008 |
| 13.2-11.7 | 12.4 | 0.0151 | 0.0206 | 0.0008 |
| 11.7-10.6 | 11.1 | 0.014 | 0.0212 | 0.0006 |
| 10.6-9.3 | 9.8 | 0.014 | 0.0220 | 0.0008 |
| 9.3-8.2 | 8.6 | 0.016 | 0.0229 | 0.0009 |
| 8.2-7.1 | 7.5 | 0.019 | 0.0241 | 0.0012 |
| 7.1-6.1 | 6.5 | 0.027 | 0.0259 | 0.0019 |
| 6.1-5.3 | 5.6 | 0.044 | 0.0286 | 0.0027 |
| 5.3-4.6 | 4.9 | 0.055 | 0.0317 | 0.0031 |
| 4.6-4.1 | 4.4 | 0.054 | 0.0344 | 0.0027 |
| 4.1-3.7 | 3.9 | 0.203 | 0.0443 | 0.0099 |
| 3.7-3.3 | 3.5 | 0.075 | 0.0476 | 0.0033 |
| 3.3-2.9 | 3.1 | 0.036 | 0.0497 | 0.0022 |
| 2.9-2.6 | 2.8 | 0.044 | 0.0517 | 0.0019 |
| 2.6-2.5 | 2.5 | 0.049 | 0.0531 | 0.0014 |
| 2.5-2.2 | 2.3 | 0.062 | 0.0558 | 0.0028 |

As can be seen in Table 3, a calculated Cumulative Pore Volume (cm$^3$/g) is associated with a range of Pore Diameter (nm) as the test incrementally desorbs the nitrogen from the test sample. An Incremental Pore Volume is then calculated for each of these ranges. A pore volume within a certain range (for example a range from 50 to 500 Å, which is equivalent to 5 to 50 nm as presented in Table 4) can be calculated by subtracting the Cumulative Pore Volume at 50 nm from the Cumulative Pore Volume at 5 nm. Where necessary, the Cumulative Pore Volume at a specific pore size can be calculated by interpolating the data within the range. This method was utilized for all of the Examples herein.

For example, to determine the total pore volume associated with pore diameters between 5 nm and 50 nm, first the Cumulative Pore Volume associated with 50 nm was calculated by interpolating the amount of the Incremental Pore Volume (highlighted) associated with the difference between 62.8 nm and 50.0 nm in the 62.8 to 41.5 nm pore diameter range as shown in the table (highlighted) and adding this amount to the Cumulative Pore Volume (highlighted) from the prior range. The calculation for the Cumulative Pore Volume associated with 50 nm pore diameter was calculated from the data in Table 4 above as follows:

$$((62.8-50.0)/(62.8-41.5)*0.0032)+0.0085=0.0104 \text{ cm}^3/\text{g}$$

The calculation is then performed similarly for the Cumulative Pore Volume associated with 5 nm pore diameter. The calculation was as follows:

$$((5.3-5.0)/(5.3-4.6)*0.0031)+0.0286=0.0299 \text{ cm}^3/\text{g}$$

The total Pore Volume associated with the pore diameter ranges of 5 nm to 50 nm (50 Å to 500 Å) of the USY of this example is thus equal to the difference in the Cumulative Pore Volumes associated with 5 nm and 50 nm respectfully as follows:

$$0.0299 \text{ cm}^3/\text{g}-0.0104 \text{ cm}^3/\text{g}=0.0195 \text{ cm}^3/\text{g}$$

This value is the Large Mesopore Volume for this USY sample as shown in Table 1. All other pore volumes associated with specific pore diameter ranges can be and were calculated herein by the same basic method.

As such, the following properties of this USY zeolite were obtained from the data:
Small Mesoporous Volume (Range: 3.0 nm to 5.0 nm): 0.0193 cm$^3$/g
Large Mesoporous Volume (Range: 5.0 nm to 50.0 nm): 0.0195 cm$^3$/g
Ratio of (Large Mesopore Volume)/(Small Mesopore Volume): 1.01
Small Mesopore Peak (dV/dlogD@3.9 nm): 0.20 cm$^3$/g Additionally, the USY zeolite sample exhibited a BET surface area of 811 m$^2$/g, and a unit cell size of 24.55 angstroms.

A sample of the prepared USY zeolite above was further subjected to an ammonium ion-exchange consisting of adding 80 grams of the zeolite into 800 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours, Chemical analysis of the dried zeolite by ICP showed 0.48 wt % Na$_2$O (dry basis). A Na$_2$O content of about 0.50 wt % was targeted. The dried zeolite was subjected to long-term deactivation steaming at 1400° F. for 16 hours, 100% steam, to determine its hydrothermal stability.

The zeolite obtained after long-term deactivation steaming was similarly analyzed in a Micromeritics® Tristar 3000® analyzer. The BJH method was applied to the N$_2$ adsorption/desorption isotherms to obtain the pore size distribution of the zeolite, and a plot of dV/dlogD vs. Average Pore Diameter is shown in FIG. 2. The following properties of this long-term deactivation steamed USY zeolite were obtained from the data:
Small Mesoporous Volume (Range: 3.0 nm to 5.0 nm): 0.0112 cm$^3$/g
Large Mesoporous Volume (Range: 5.0 nm to 50.0 nm): 0.1211 cm$^3$/g
Ratio of (Large Mesopore Volume)/(Small Mesopore Volume): 10.85
Small Mesopore Peak (dV/dlogD@3.9 nm): 0.19 cm$^3$/g Additionally, the USY zeolite after long-term deactivation steaming exhibited a BET surface area of 565 m$^2$/g, and a unit cell size of 24.27 angstroms.

Example 2

In this example, an embodiment of the Extra Mesoporous Y ("EMY") zeolite was prepared as follows:

The same commercial ammonium-exchanged Y zeolite (CBV-300®) with a low sodium content (SiO$_2$/Al$_2$O$_3$ molar ratio=5.3, Na$_2$O 3.15 wt % on dry basis) as in Example 1 was placed in a horizontal quartz tube, which was inserted into a horizontal oven pre-equilibrated at 1400° F. in 100% steam at atmospheric pressure. Utilizing this procedure, the temperature of the zeolite precursor was raised to within 50° F. of the high temperature steam calcination temperature (i.e., to 1350° F.) within 5 minutes. The steam was let to pass through the zeolite powders. After 1 hour, the tube was removed from the horizontal oven and resulting EMY zeolite powders were collected. It should be noted that the starting material (i.e., the EMY precursor zeolite) selected was a low sodium content Y zeolite. As described in the specification above, it is believed that production of the EMY zeolite is dependent upon the proper zeolite sodium content prior to high temperature steam calcination. If the sodium content is not within the specifications as described herein, the starting Y zeolite may first require ammonium-exchange or methods as known in the art to reduce the sodium content of the EMY zeolite precursor to acceptable levels prior to high temperature steam calcination to produce the EMY zeolite.

The resulting EMY zeolite was analyzed by a Micromeritics® Tristar 3000® analyzer as used in Example 1. The BJH method as described in the specification was applied to the N$_2$ adsorption/desorption isotherms to obtain the pore size distribution of the zeolite, and a plot of dV/dlogD vs. Average Pore Diameter is shown in FIG. 3. The following properties of this EMY zeolite were obtained:
Small Mesoporous Volume (Range: 3.0 nm to 5.0 nm): 0.0109 cm$^3$/g
Large Mesoporous Volume (Range: 5.0 nm to 50.0 nm): 0.0740 cm$^3$/g
Ratio of (Large Mesopore Volume)/(Small Mesopore Volume): 6.79
Small Mesopore Peak (dV/dlogD@3.9 nm): 0.09 cm$^3$/g Additionally, the EMY zeolite sample exhibited a BET surface area of 619 m$^2$/g, and a unit cell size of 24.42 angstroms.

A sample of the EMY zeolite above was further subjected to an ammonium ion exchange consisting of adding 100 grams of the EMY zeolite into 1000 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours. The ammonium ion exchange was repeated using 60 g of the washed EMY zeolite in 600 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours. Chemical analysis of the dried zeolite by ICP showed 0.64 wt % $Na_2O$ (dry basis). A $Na_2O$ content of about 0.50 wt % was targeted. This zeolite was then subjected to long-term deactivation steaming at 1400° F. for 16 hours, 100% steam, to determine its hydrothermal stability.

The EMY zeolite obtained after long-term deactivation steaming was also analyzed by a Micromeritics® Tristar 3000® analyzer. The BJH method was applied to the $N_2$ adsorption/desorption isotherms to obtain the pore size distribution of the zeolite, and a plot of dV/dlogD vs. Average Pore Diameter is shown in FIG. 4. The following properties of the EMY zeolite after long-term deactivation steaming were thus Obtained from the data:

Small Mesoporous Volume (Range: 3.0 nm to 5.0 nm): 0.0077 $cm^3/g$

Large Mesoporous Volume (Range: 5.0 nm to 50.0 nm): 0.1224 $cm^3/g$

Ratio of (Large Mesopore Volume)/(Small Mesopore Volume): 15.97

Small Mesopore Peak (dV/dlogD@3.9 nm): 0.10 $cm^3/g$

Additionally, the surface area of the EMY zeolite after long-term deactivation steaming was analyzed by a BET Test. The zeolite exhibited a BET surface area of 587 $m^2/g$, and a unit cell size of 24.27 angstroms.

Example 3

Hydrocracking Catalyst Synthesis

In this Example, four (4) hydrocracking catalysts of invention (labeled herein as Catalyst Samples 1 through 4) and seven (7) reference hydrocracking catalysts (labeled herein as Catalyst Samples 5 through 11) were prepared.

All of the hydrocracking catalysts tested in this example (both of Invention and Reference) have equivalent contents of zeolite (Y-zeolite) and equivalent content of the alumina binder. Except for the differences in the zeolite (and zeolite preparation), each of these catalysts were prepared by identical procedures, with the exception that the only additional difference in the catalysts preparations are in the active metal loadings (i.e., in this example, platinum, Pt) utilized between some of the catalysts.

For hydrocracking testing and comparison purposes, each of the catalysts were only impregnated with a single Group 8/9/10 metal (platinum, Pt).

Because these catalysts were made at different times, the active metal (i.e., Pt) loadings differed, with some of the catalysts with 0.6 wt % Pt loading, and some with 2 wt % Pt loading. Although the metal loadings differed between some of the catalysts, it is believed that this slight difference in the metal loadings does not have any significant effect on the comparative data (i.e., conversions, distillate yields, or distillate selectivities) provided in the testing herein.

Figure 9:
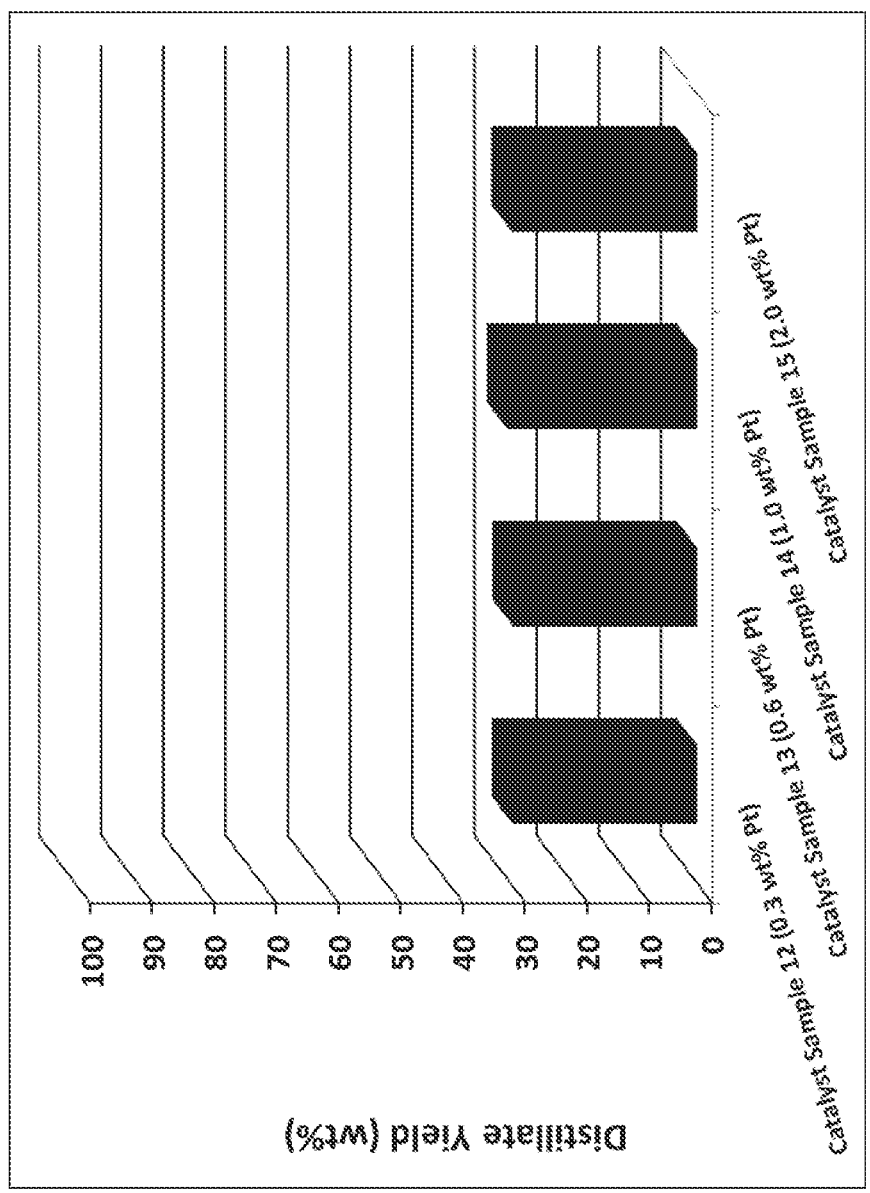
FIG. 9 shows the distillate product yields for four (4) comparative hydroprocessing catalysts with respective platinum (Pt) metal loadings of 0.3 wt %, 0.6 wt %, 1.0 wt % and 2.0 wt %.
Figure 10:
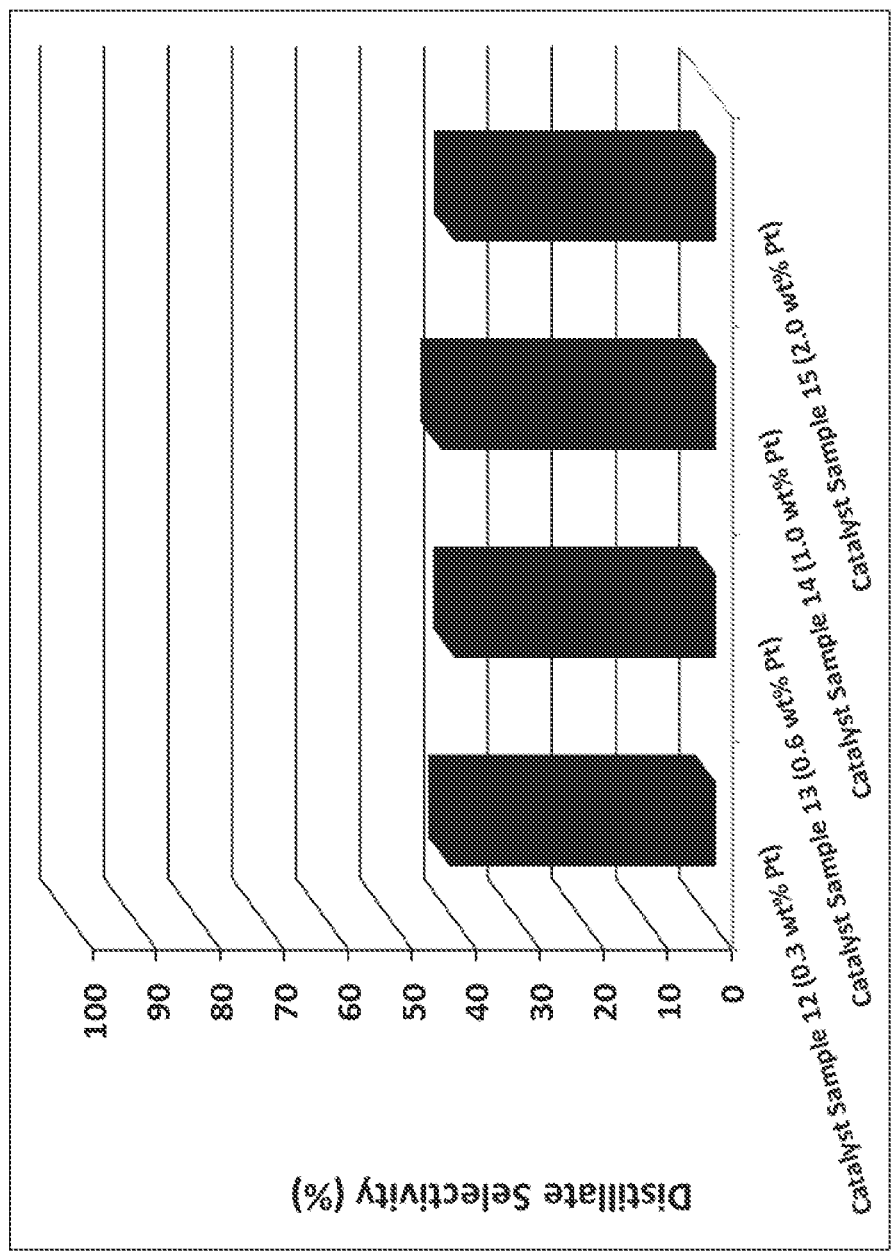
FIG. 10 shows the distillate product selectivities for four (4) comparative hydroprocessing catalysts with respective platinum (Pt) metal loadings of 0.3 wt %, 0.6 wt %, 1.0 wt % and 2.0 wt %.

In support of this position, separate testing was performed on four (4) similar alumina supported zeolite-containing catalysts tested under hydrocracking conditions with the only difference in catalysts being the active metal (platinum) loading. The four catalysts had a platinum (Pt) loading of 0.3 wt % (Catalyst Sample 12), 0.6 wt % (Catalyst Sample 13), 1.0 wt % (Catalyst Sample 14), and 2.0 wt % (Catalyst Sample 15) based on the catalyst weight, respectively. The results of this testing of these four catalysts are shown graphically in FIG. 9 (showing the Distillate Yield for each catalyst sample) and FIG. 10 (showing the Distillate Selectivity for each catalyst sample). As can be seen from these figures, while it is believed that some minimum level of active metal loading is pertinent to the overall catalyst performance, that the differences between 0.3 wt % to 2.0 wt % active metal loadings do not lead in themselves to any significant differences in the overall hydrocracking results. As such, it is the belief and position herein that the differences between the 0.6 wt % and 2.0 wt % active metal (Pt) loadings in Examples 2 and 3 herein do not significantly affect the comparative performance data results shown in these examples.

The preparation procedures for each of the eleven (11) hydrocracking catalysts in these examples are described as follows.

Catalyst Sample 1—EMY Hydrocracking Catalyst—Formulation 1 (Invention)

In this hydrocracking catalyst sample of invention, an EMY hydrocracking catalyst was prepared by the following method.

The EMY zeolite utilized in this catalyst sample started with a commercial USY zeolite made by Zeolyst® under the name CBV-300®. The 200 g of the zeolite was steamed for one hour in 100% steam in a horizontal steamer. The steamed zeolite was placed in a beaker. A 3 pH buffered 1N $NH_4NO_3$ ion-exchange solution (5 ml/gm) was added to the beaker and the contents stirred for 1 hour at ambient temperature. The zeolite sample was filtered and then the ion-exchange procedure was repeated for a second time with a fresh buffered solution. Again, the zeolite sample was filtered and then the ion-exchange procedure was repeated for a third time with a fresh buffered solution. The zeolite sample was filtered and rinsed thoroughly with deionized (DI) water and vacuum dried. The resulting zeolite was the dried for approximately 6 hours at 250° F. The resulting zeolite was then steamed for 16 hours in 100% steam. The resulting zeolite then underwent three (3) more ion-exchange procedures (same as prior) and then was filtered and rinsed thoroughly with deionized (DI) water and vacuum dried. The resulting zeolite was the dried for approximately 6 hours at 250° F. The resulting zeolite was then calcined for approximately 6 hours at 1000° F. in air. Approximately 30 g of the resulting zeolite was placed in a beaker and underwent two (2) more ion-exchange procedures (same as prior) and then was filtered and rinsed thoroughly with deionized (DI) water and vacuum dried. The resulting zeolite was the dried at 250° F. The resulting zeolite was then calcined for approximately 6 hours at 1000° F. in air.

About 65 parts of the resulting EMY zeolite was mixed with about 35 parts of Versal® 300 pseudoboehmite alumina binder (basis: calcined at ~538° C.) in a Simpson™ muller. Tetraethylammonium Hydroxide (TEAOH) was added to a sufficient quantity of water to produce a 2% solution, and was added to produce an extrudable paste on a ~2" (~5.1 cm) diameter Bonnot® extruder. The mixture of USY crystal, pseudoboehmite alumina, and TEAOH/water was extruded into ~1/16" diameter quadrulobes, and then dried in a hotpack oven at ~250° F. (121° C.) overnight (for about 10-18 hours). The dried extrudate was calcined in 100% air at 1000° F. (538° C.) for six hours.

Once complete, the extrudate was then impregnated via incipient wetness to ~2.0 wt % Pt using tetraammineplatinumnitrate, dried in a hotpack oven at ~121° C. overnight (for about 3 hours), followed by calcination in air for about 3 hours at ~680° F. (~405° C.) to form Catalyst Sample 1.

In this version of the EMY hydrocracking catalyst, it is preferred that the starting USY undergoes at least one, preferably more than one ion exchange, followed by steam calcination, followed by at least one, preferably more than one ion exchange, followed by air calcining at a temperature of from about 800° F. to about 1200° F., or more preferably, at a temperature of at least 1000° F. In other embodiments, the zeolite nay be further subjected to at least one additional ion-exchange, followed by a second air calcining at a temperature of from about 800° F. to about 1200° F., or more preferably, at a temperature of at least 1000° F. Preferably, the starting zeolite is a low sodium USY with a sodium content preferably less than about 0.1 wt %, or even more preferably less than about 0.05 wt %. Preferably, in the steam calcination step, the steam calcination temperature is from about 1200 to 1500° F., or preferably at least 1200° F., more preferably at least 1300° F., even more preferably at least 1400° F., and the temperature of the zeolite precursor is raised to within 50° F. of the steam calcination temperature within 5 minutes (i.e., very fast steam calcination temperature ramp rate).

Catalyst Sample 2—EMY Hydrocracking Catalyst—Formulation 2 (Invention)

In this hydrocracking catalyst sample of invention, an EMY hydrocracking catalyst was prepared by the following method.

The EMY zeolite utilized in this catalyst sample started with a commercial USY zeolite made by Zeolyst® under the name CBV-300®. The 200 g of the zeolite was steamed for one hour in 100% steam in a horizontal steamer. The steamed zeolite was placed in a beaker. A 3 pH buffered 1N NH$_4$NO$_3$ ion-exchange solution (5 ml/gm) was added to the beaker and the contents stirred for 1 hour at ambient temperature. The zeolite sample was filtered and then the ion-exchange procedure was repeated for a second time with a fresh buffered solution. Again, the zeolite sample was filtered and then the ion-exchange procedure was repeated for a third time with a fresh buffered solution. The zeolite sample was filtered and rinsed thoroughly with deionized (DI) water and vacuum dried. The resulting zeolite was the dried for approximately 6 hours at 250° F. The resulting zeolite was then steamed for 16 hours in 100% steam. The resulting zeolite then underwent three (3) more ion-exchange procedures (same as prior) and then was filtered and rinsed thoroughly with deionized (DI) water and vacuum dried. The resulting zeolite was the dried for approximately 6 hours at 250° F. Approximately 30 g of the resulting zeolite was placed in a beaker and underwent two (2) more ion-exchange procedures (same as prior) and then was filtered and rinsed thoroughly with deionized (DI) water and vacuum dried. The resulting zeolite was the dried at 250° F. The resulting zeolite was then calcined for approximately 6 hours at 1000° F. in air.

About 65 parts of the resulting EMY zeolite was mixed with about 35 parts of Versal® 300 pseudoboehmite alumina binder utilizing the same procedure as described for Catalyst 1 to form the extrudate.

The extrudate was then impregnated to an active metal loading of ~2.0 wt % Pt using the same procedure as described for Catalyst Sample 1 to form Catalyst Sample 2.

In this version of the EMY hydrocracking catalyst, it is preferred that the starting USY undergoes at least one, preferably more than one ion exchange, followed by steam calcination, followed by at least one, preferably more than one ion exchange, followed by air calcining at a temperature of from about 800° F. to about 1200° F. or more preferably, at a temperature of at least 1000° F. Preferably, the starting zeolite is a low sodium USY with a sodium content preferably less than about 0.1 wt %, or even more preferably less than about 0.05 wt %. Preferably, in the steam calcination step, the steam calcination temperature is from about 1200 to 1500° F., or preferably at least 1200° F., more preferably at least 1300° F., even more preferably at least 1400° F., and the temperature of the zeolite precursor is raised to within 50° F. of the steam calcination temperature within 5 minutes (i.e., very fast steam calcination temperature ramp rate).

Catalyst Sample 3—EMY Hydrocracking Catalyst—Formulation 3 (Invention)

In this hydrocracking catalyst sample of invention, an EMY hydrocracking catalyst was prepared by the following method.

The HAY zeolite utilized in this catalyst sample started with a commercial USY zeolite made by Zeolyst® under the name CBV-300®. The 200 g of the zeolite was steamed for one hour in 100% steam in a horizontal steamer. The steamed zeolite was placed in a beaker. A 3 pH buffered 1N NH$_4$NO$_3$ ion-exchange solution (5 ml/gm) was added to the beaker and the contents stirred for 1 hour at ambient temperature. The zeolite sample was filtered and then the ion-exchange procedure was repeated for a second time with a fresh buffered solution. Again, the zeolite sample was filtered and then the ion-exchange procedure was repeated for a third time with a fresh buffered solution. The zeolite sample was filtered and rinsed thoroughly with deionized (DI) water and vacuum dried. The resulting zeolite was the dried for approximately 6 hours at 250° F. The resulting zeolite was then steamed for 16 hours in 100% steam. The resulting zeolite then washed in a 1.5M oxalic acid solution for approximately 2 hours at 176° F. and then was filtered and rinsed thoroughly with deionized (DI) water and vacuum dried. The oxalic acid wash was then repeated and the zeolite was filtered and rinsed thoroughly with deionized (DI) water and vacuum dried. The resulting zeolite was the dried for approximately 6 hours at 250° F. The resulting zeolite was then calcined for approximately 6 hours at 1000° F. in air. Approximately 30 g of the resulting zeolite was placed in a beaker and underwent two (2) more ion-exchange procedures (same as prior) and then was filtered and rinsed thoroughly with deionized (DI) water and vacuum dried. The resulting zeolite was the dried at 250° F. The resulting zeolite was then calcined for approximately 6 hours at 1000° F. in air.

About 65 parts of the resulting EMY zeolite was mixed with about 35 parts of Versal® 300 pseudoboehmite alumina binder utilizing the same procedure as described for Catalyst 1 to form the extrudate.

The extrudate was then impregnated to an active metal loading of ~2.0 wt % Pt using the same procedure as described for Catalyst Sample 1 to form Catalyst Sample 3.

In this version of the EMY hydrocracking catalyst, it is preferred that the starting USY undergoes at least one, preferably more than one ion exchange, followed by steam calcination, followed an acid wash, followed by air calcining at a temperature of from about 800° F. to about 1200° F., or more preferably, at a temperature of at least 1000° F. In other embodiments, the zeolite may be further subjected to at least one additional ion-exchange, followed by a second air calcining at a temperature of from about 800° F. to about 1200° F., or more preferably, at a temperature of at least 1000° F. Preferably, the starting zeolite is a low sodium USY with a sodium content preferably less than about 0.1 wt %, or even more preferably less than about 0.05 wt %. Preferably, in the steam calcination step, the steam calcination temperature is from about 1200 to 1500° F., or preferably at least 1200° F., more preferably at least 1300° F., even more preferably at least 1400° F., and the temperature of the zeolite precursor is raised to within 50° F. of the steam calcination temperature within 5 minutes (i.e., very fast steam calcination temperature ramp rate). Preferably the acid wash is comprised of a carboxylic acid; more preferably, the acid wash is comprised of oxalic acid.

Catalyst Sample 4—EMY Hydrocracking Catalyst—Formulation 4 (Invention)

In this hydrocracking catalyst sample of invention, an EMY hydrocracking catalyst was prepared by the following method.

The EMY zeolite utilized in this catalyst sample started with a commercial USY zeolite made by Zeolyst® under the name CBV-300®. The 200 g of the zeolite was steamed for one hour in 100% steam in a horizontal steamer. The steamed zeolite was placed in a beaker. A 3 pH buffered 1N $NH_4NO_3$ ion-exchange solution (5 ml/gm) was added to the beaker and the contents stirred for 1 hour at ambient temperature. The zeolite sample was filtered and then the ion-exchange procedure was repeated for a second time with a fresh buffered solution. Again, the zeolite sample was filtered and then the ion-exchange procedure was repeated for a third time with a fresh buffered solution. The zeolite sample was filtered and rinsed thoroughly with deionized (DI) water and vacuum dried. The resulting zeolite was the dried for approximately 6 hours at 250° F. The resulting zeolite was then steamed for 16 hours in 100% steam. The resulting zeolite then underwent three (3) more ion-exchange procedures (same as prior) and then was filtered and rinsed thoroughly with deionized (DI) water and vacuum dried. The resulting zeolite was the dried for approximately 6 hours at 250° F. The resulting zeolite was then steamed for 16 hours at 1400° F. in 100% steam.

About 65 parts of the resulting EMY zeolite was mixed with about 35 parts of Versal® 300 pseudoboehmite alumina binder utilizing the same procedure as described for Catalyst 1 to form the extrudate.

The extrudate was then impregnated to an active metal loading of ~2.0 wt % Pt using the same procedure as described for Catalyst Sample 1 to form Catalyst Sample 4.

In this version of the EMY hydrocracking catalyst, it is preferred that the starting USY undergoes at least one, preferably more than one ion exchange, followed by steam calcination, followed by at least one, preferably more than one ion exchange, followed by air calcining at a temperature of from about 800° F. to about 1200° F., or more preferably; at a temperature of at least 1000° F. In other embodiments, the zeolite may be further subjected to at least one additional ion-exchange, followed by another steam calcination step at a temperature of at least 1400° F. Preferably, the starting zeolite is a low sodium USY with a sodium content preferably less than about 0.1 wt %, or even more preferably less than about 0.05 wt %. Preferably, at least one steam calcination step, preferably the first steam calcination step, the steam calcination temperature is from about 1200 to 1500° F., or preferably at least 1200° F., more preferably at least 1300° F., even more preferably at least 1400° F., and the temperature of the zeolite precursor is raised to within 50° F. of the steam calcination temperature within 5 minutes (i.e., very fast steam calcination temperature ramp rate). In another preferred embodiment, the starting zeolite undergoes a steam calcination step prior to the first ion exchange step.

Catalyst Sample 5—Alumina Supported CBV-901®—(Reference)

In this hydrocracking catalyst sample, a USY reference catalyst was prepared by the following method.

The reference USY zeolite utilized in this catalyst sample was a commercial USY zeolite made by Zeolyst® under the name CBV-901®. Here the zeolite was utilized in the reference hydrocracking catalyst in the as-purchased state.

The hydrocracking catalyst was prepared from the zeolite in essentially the same manner as EMY sample catalysts preps 1-4 (as well as reference Catalyst Sample preps 6-11). That is, about 65 parts of the CBV-901® zeolite was mixed with about 35 parts of Versal® 300 pseudoboehmite alumina binder utilizing the same procedure as described for Catalyst Sample 1 to form the extrudate.

The extrudate was then impregnated to an active metal loading of ~0.6 wt % Pt using essentially the same procedure as described for Catalyst Sample 1 to form Catalyst Sample 5.

Catalyst Sample 6—Alumina Supported HSZ-360®—(Reference)

In this hydrocracking catalyst sample, a USY reference catalyst was prepared by the following method.

The reference USY zeolite utilized in this catalyst sample was a commercial USY zeolite made by Tosoh® under the name HSV-360®. Here the zeolite was utilized in the reference hydrocracking catalyst in the as-purchased state.

The hydrocracking catalyst was prepared from the zeolite in essentially the same manner as EMY sample catalysts preps 1-4 (as well as reference Catalyst Sample preps 5 and 7-11). That is, about 65 parts of the HSV-360 ® zeolite was mixed with about 35 parts of Versa® 300 pseudoboehmite alumina binder utilizing the same procedure as described for Catalyst Sample 1 to form the extrudate.

The extrudate was then impregnated to an active metal loading of ~0.6 wt % Pt using essentially the same procedure as described for Catalyst Sample 1 to form Catalyst Sample 6.

Catalyst Sample 7—Alumina Supported CBV-720®—(Reference)

In this hydrocracking catalyst sample, a USY reference catalyst was prepared by the following method.

The reference USY zeolite utilized in this catalyst sample was a commercial USY zeolite made by Zeolyst® under the name (CBV-720®. Here the zeolite was utilized in the reference hydrocracking catalyst in the as-purchased state.

The hydrocracking catalyst was prepared from the zeolite in essentially the same manner as EMY sample catalysts preps 1-4 (as well as reference Catalyst Sample preps 5-6 and 8-11). That is, about 65 parts of the CBV-720® zeolite was mixed with about 35 parts of Versal® 300 pseudoboehmite alumina binder utilizing the same procedure as described for Catalyst Sample 1 to form the extrudate.

The extrudate was then impregnated to an active metal loading of ~0.6 wt % Pt using essentially the same procedure as described for Catalyst Sample 1 to form Catalyst Sample 7.

Catalyst Sample 8—Alumina Supported HSZ-390HUA®—(Reference)

In this hydrocracking catalyst sample, a USY reference catalyst was prepared by the following method.

The reference USY zeolite utilized in this catalyst sample was a commercial USY zeolite made by Tosoh® under the name HSV-390HUV®. Here the zeolite was utilized in the reference hydrocracking catalyst in the as-purchased state.

The hydrocracking catalyst was prepared from the zeolite in essentially the same manner as EMY sample catalysts preps 1-4 (as well as reference Catalyst Sample preps 5-7 and 9-11). That is, about 65 parts of the HSV-390HUA® zeolite was mixed with about 35 parts of Versal® 300 pseudoboehmite alumina binder utilizing the same procedure as described for Catalyst Sample 1 to form the extrudate.

The extrudate was then impregnated to an active metal loading of ~0.6 wt % Pt using essentially the same procedure as described for Catalyst Sample 1 to form Catalyst Sample 8.

Catalyst Sample 9—Alumina Supported CBV-766®—(Reference),

In this hydrocracking catalyst sample, a USY reference catalyst was prepared by the following method.

The reference USY zeolite utilized in this catalyst sample was a commercial USY zeolite made by Zeolyst® under the name CBV-760®. Here the zeolite was utilized in the reference hydrocracking catalyst in the as-purchased state.

The hydrocracking catalyst was prepared from the zeolite in essentially the same manner as EMY sample catalysts preps 1-4 (as well as reference Catalyst Sample preps 5-8 and 10-11). That is, about 65 parts of the CBV-760® zeolite was mixed with about 35 parts of Versal® 300 pseudoboehmite alumina binder utilizing the same procedure as described for Catalyst Sample 1 to form the extrudate.

The extrudate was then impregnated to an active metal loading of 0.6 wt % Pt using essentially the same procedure as described for Catalyst Sample 1 to form Catalyst Sample 9.

Catalyst Sample 10—Alumina Supported CBV-780®—(Reference)

In this hydrocracking catalyst sample, a USY reference catalyst was prepared by the following method.

The reference USY zeolite utilized in this catalyst sample was a commercial USY zeolite made by Zeolyst® under the name CBV-780®. Here the zeolite was utilized in the reference hydrocracking catalyst in the as-purchased state.

The hydrocracking catalyst was prepared from the zeolite in essentially the same manner as EMY sample catalysts preps 1-4 (as well as reference Catalyst Sample preps 5-9 and 11). That is, about 65 parts of the CBV-780 ® zeolite was mixed with about 35 parts of Versal® 300 pseudoboehmite alumina binder utilizing the same procedure as described for Catalyst Sample 1 to form the extrudate.

The extrudate was then impregnated to an active metal loading of ~0.6 wt % Pt using essentially the same procedure as described for Catalyst Sample 1 to form Catalyst Sample 10.

Catalyst Sample 11—Alumina Supported HSZ-385HUA®—(Reference)

In this hydrocracking catalyst sample, a USY reference catalyst was prepared by the following method.

The reference USY zeolite utilized in this catalyst sample was a commercial USY zeolite made by Tosoh® under the name RSV-385HUA®. Here the zeolite was utilized in the reference hydrocracking catalyst in the as-purchased state.

The hydrocracking catalyst was prepared from the zeolite in essentially the same manner as EMY sample catalysts preps 1-4 (as well as reference Catalyst Sample preps 5-10). That is, about 65 parts of the HSV-385HUA® zeolite was mixed with about 35 parts of Versal® 300 pseudoboehmite alumina binder utilizing the same procedure as described for Catalyst Sample 1 to form the extrudate.

The extrudate was then impregnated to an active metal loading of ~0.6 wt % Pt using essentially the same procedure as described for Catalyst Sample 1 to form Catalyst Sample 11.

Example 4

Hydrocracking Catalyst Testing

In this Example, the catalysts prepared above were tested under hydrocracking conditions in 1) a "batch unit" high-throughput microreactor, and/or 2) a "flow unit" high-throughput microreactor.

The main difference in the manner in which these two microreactors are operated is that in the "batch unit" type reactors, the catalyst and teed are placed in the reactor vessel and then are subjected to reaction conditions. That is the feed (as well as the catalyst) is stationary in the reactor during the testing (i.e., testing performed under "non-flow" reactor conditions). Conversely, in the "flow unit" type reactors, the catalyst is placed in the reactor vessel (i.e., the catalyst is stationary) and then the feed is passed through the catalyst under reaction conditions. That is the testing performed under "feed-flow" reactor conditions. As a result, of the two (2) different testing protocols and timing of the tests, while all four (4) catalyst examples of the invention (i.e., Catalyst Samples 1-4) were tested in both types of these high-throughput reactors, the other reference catalysts (Catalyst Samples 5-13) were only tested in batch unit (non-flow) microreactor configuration.

Batch Unit Testing

All four (4) of the example EMY hydrocracking catalysts of invention (Sample Catalysts 1-4 above) and all seven (7) of the example reference hydrocracking catalysts (Sample Catalysts 5-11 above) were tested in a high-throughput "batch unit" microreactor. In this example, the catalysts were tested under batch hydrocracking conditions as follows: 330° C. (626° F.), 725 psig, and 100% $H_2$ treat gas. The feedstock utilized in the testing was a typical hydrocracking hydrocarbon feedstock boiling substantially in the range of about 700 to about 1100° F. (371 to 593° C.), with a density at 70° C. of 0.8326 $g/cm^3$, a sulfur content of 43 ppm, and a nitrogen content of <10 ppm.

FIGS. 5 and 6 graphically show the results of the batch unit testing of the samples for both Distillate Yield (FIG. 5) and Distillate Selectivity (FIG. 6).

Flow Unit Testing

Only the four (4) of the example EMY hydrocracking catalysts of invention (Sample Catalysts 1-4 above) were tested in a high-throughput "flow unit" microreactor. In this example, the catalysts were tested under flow through hydrocracking conditions as follows: temperature conditions varied from 320 to 370° C. (608 to 698° F.) during testing, pressure=1275 psig, and 100% $H_2$ treat gas at ~2 LHSV. Multiple data points were taken for each catalyst at varying temperature conditions. The feedstock utilized in the testing was a typical hydrocracking hydrocarbon feedstock boiling substantially in the range of about 700 to about 1100° F. (371 to 593° C.), with a density at 70° C. of 0.8412 $g/cm^3$, a sulfur content of 178 ppm, and a nitrogen content of <10 ppm. The reaction products were retrieved during various points in the process and analyzed.

FIGS. 7 and 8 graphically show the results of the flow unit testing of the samples for both Distillate Yield (FIG. 7) and Distillate Selectivity (FIG. 8).

What is claimed is:

1. A hydrocracking catalyst comprised of:
   a Y zeolite with a Large Mesopore Volume of at least about 0.03 $cm^3/g$ and a Small Mesopore Peak of less than about 0.15 $cm^3/g$;
   an inorganic matrix; and
   at least one active metal selected from Group 6 and Group 8/9/10 metals.

2. The catalyst of claim 1, wherein the zeolite has a Large-to-Small Pore Volume Ratio of at least about 4.0.

3. The catalyst of claim 1, wherein the unit cell size of the zeolite is less than about 24.45 Angstroms.

4. The catalyst of claim 1, wherein the inorganic matrix is comprised of silica, alumina, or combinations thereof.

5. The catalyst of claim 1, wherein the inorganic matrix is comprised of pseudoboehmite alumina.

6. The catalyst of claim 1, wherein the catalyst is comprised of at least one Group 8 metal selected from Pt and Pd.

7. The catalyst of claim 1, wherein the catalyst is comprised of at least one Group 6 metal and one Group 8/9/10 metal.

8. The catalyst of claim 4, wherein the catalyst is comprised of at least one Group 6 metal and one Group 8/9/10 metal.

9. The catalyst of claim 8, wherein the Group 6 metal is selected from Cr, Mo, and W, and the Group 8/9/10 metal is selected from Fe, Co, Ni, Ru, Rh, Pd, Os, Ir, and Pt.

10. The catalyst of claim 9, wherein the Group 6 metal is Mo and the Group 8/9/10 metal is selected from Co.

11. The catalyst of claim 9, wherein the Group 6 metal is W and the Group 8/9/10 metal is selected from Ni.

12. The catalyst of claim 9, wherein the combined amount of Group 6 metal and one Group 8/9/10 metal is from 1 wt % to 25 wt %.

13. The catalyst of claim 1, wherein the zeolite is present in the hydrocracking catalyst in an amount of at least 10 wt % based on the hydrocracking catalyst weight.

14. The catalyst of claim 1, wherein the hydrocracking catalyst has a 40 Å Peak of less than about 0.15 $cm^3/g$.

15. The catalyst of claim 1, wherein the zeolite has been made from a zeolite precursor wherein the zeolite precursor is subjected to a high temperature steam calcination step at a temperature from about 1200° F. to about 1500° F. wherein the temperature of the zeolite precursor is within 50° F. of the high temperature steam calcination temperature in less than 5 minutes.

16. The catalyst of claim 15, wherein the zeolite precursor is a sodium-Y zeolite.

17. The catalyst of claim 15, wherein the zeolite precursor is subjected to at least one first ion-exchange step by contacting the zeolite precursor with a first ion-exchange solution prior to the high temperature steam calcination step.

18. The catalyst of claim 17, wherein the ion-exchange solution comprises $NH_4NO_3$.

19. The catalyst of claim 17, wherein the zeolite precursor is subjected to at least one second ion-exchange step by contacting the zeolite precursor with a second ion-exchange solution after the high temperature steam calcination step.

20. The catalyst of claim 19, wherein the zeolite precursor is calcined in air at a temperature of from about 800° F. to about 1200° F. after the second ion-exchange.

21. The catalyst of claim 17, wherein the zeolite precursor is subjected to at least one acid washing step by contacting the zeolite precursor with an acidic solution after the high temperature steam calcination step.

22. The catalyst of claim 21, wherein the acidic solution comprises oxalic acid.

23. The catalyst of claim 22, wherein the zeolite precursor is calcined in air at a temperature of from about 800° F. to about 1200° F. after the at least one acid washing step.

24. The catalyst of claim 15, wherein the zeolite precursor is subjected to at least one first ion-exchange step by contacting the zeolite precursor with a first ion-exchange solution after the high temperature steam calcination step.

25. The catalyst of claim 24, wherein the zeolite precursor is further subjected to:
contacting the zeolite precursor with steam;
subjected the zeolite precursor to at least one second ion-exchange step by contacting the zeolite precursor with a second ion-exchange solution after the high temperature steam calcination step; and
contacting the zeolite precursor with steam at a temperature from about 1200° F. to about 1500° F.

26. The catalyst of claim 15, wherein the $Na_2O$ content of the zeolite precursor prior to the high temperature steam calcination step is from about 2 to about 5 wt % of the total precursor weight on a dry basis.

27. The catalyst of claim 2, wherein the Small Mesopore Volume Peak of the zeolite is less than about 0.13 $cm^3/g$.

28. The catalyst of claim 27, wherein the Large Mesopore Volume of the zeolite is at least about 0.05 $cm^3/g$.

29. A method of making a hydrocracking catalyst, comprising the steps of:
a) making a zeolite from a zeolite precursor;
b) combining a binder precursor selected from a silica, an alumina, or a combination thereof, with a zeolite to form a catalyst mixture;
c) drying the catalyst mixture to form a catalyst precursor; and
d) adding at least one active metal to the catalyst precursor to form the hydrocracking catalyst;
wherein the zeolite is a Y zeolite with a Large Mesopore Volume of at least about 0.03 $cm^3/g$ and a Small Mesopore Peak of less than about 0.15 $cm^3/g$.

30. The method of claim 29, wherein the zeolite precursor is subjected to a high temperature steam calcination step at a temperature from about 1200° F. to about 1500° F., wherein the temperature of the zeolite precursor is within 50° F. of the high temperature steam calcination temperature in less than 5 minutes.

31. The method of claim 29, wherein the zeolite precursor is a sodium-Y zeolite.

32. The method of claim 30, wherein the zeolite precursor is subjected to at least one first ion-exchange step by contacting the zeolite precursor with a first ion-exchange solution prior to the high temperature steam calcination step.

33. The method of claim 32, herein the ion-exchange solution comprises $NH_4NO_3$.

34. The method of claim 32, wherein the zeolite precursor is subjected to at least one second ion-exchange step by contacting the zeolite precursor with at least one second ion-exchange solution after the high temperature steam calcination step.

35. The method of claim 34, wherein the zeolite precursor is calcined in air at a temperature of from about 800° F. to about 1200° F. after the at least one second ion-exchange.

36. The method of claim 32, wherein the zeolite precursor is subjected to at least one acid washing step by contacting the zeolite precursor with an acidic solution after the high temperature steam calcination step.

37. The method of claim 36, wherein the acidic solution comprises oxalic acid.

38. The method of claim 37, wherein the zeolite precursor is calcined in air at a temperature of from about 800° F. to about 1200° F. after the at least one acid washing step.

39. The method of claim 30, wherein the zeolite precursor is subjected to at least one first ion-exchange step by contacting the zeolite precursor with a first ion-exchange solution after the high temperature steam calcination step.

40. The method of claim 39, wherein the zeolite precursor is further subjected to:
contacting the zeolite precursor with steam;
subjected the zeolite precursor to at least one second ion-exchange step by contacting the zeolite precursor with a second ion-exchange solution after the high temperature steam calcination step; and
contacting the zeolite precursor with steam at a temperature from about 1200° F. to about 1500° F.

41. The method of claim 30, wherein the binder precursor is comprised of pseudoboehmite alumina.

42. The method of claim 30, wherein tetraethylammonium hydroxide and water are added to the catalyst mixture in step b).

43. The method of claim 30, wherein the catalyst precursor is calcined in air at a temperature from about at a temperature of from about 800° F. to about 1200° F. after the drying in step c) and prior to the adding of the at least one active metal in step d).

44. The method of claim 30, wherein the at least one active metal is added to the catalyst precursor via incipient wetness technique.

45. The method of claim 30, wherein the at least one active metal is comprised of at least one Group 8 metal selected from Pt and Pd.

46. The method of claim 30, wherein the at least one active metal is comprised of at least one Group 6 metal and at least one Group 8/9/10 metal.

47. The method of claim 46, wherein the Group 6 metal is selected from Cr, Mo, and W, and the Group 8/9/10 metal is selected from Fe, Co, Ni, Ru, Rh, Pd, Os, Ir, and Pt.

48. The method of claim 47, wherein the Group 6 metal is Mo and the Group 8/9/10 metal is selected from Co.

49. The method claim 47, wherein the Group 6 metal is W and the Group 8/9/10 metal is selected from Ni.

50. The method of claim 46, wherein the combined amount of Group 6 metal and one Group 8/9/10 metal is from 1 wt % to 25 wt %.

51. The method of claim 29, wherein the zeolite is present in the hydrocracking catalyst in an amount of at least 10 wt % based on the hydrocracking catalyst weight.

52. The method of claim 29, wherein the hydrocracking catalyst has a 40 Å Peak of less than about 0.15 cm$^3$/g.

53. A hydrocracking process for selectively catalytically cracking a hydrocarbon feedstock to form a distillate product, comprising:
a) contacting the hydrocarbon feedstock, in the presence of hydrogen, with a hydrocracking catalyst comprised of a Y zeolite with a Large Mesopore Volume of at least about 0.03 cm$^3$/g and a Small Mesopore Peak of less than about 0.15 cm$^3$/g; an inorganic matrix; and at least one active metal selected from Group 6 and Group 8/9/10 metals under hydrocracking conditions; and
b) producing at least one distillate product stream boiling in the range of about 400 to 700° F. which has a lower average molecular weight than the hydrocarbon feedstock;
wherein the zeolite has a Large Mesopore Volume of at least about 0.03 cm$^3$/g, and a Small Mesopore Peak of less than about 0.15 cm$^3$/g.

54. The process of claim 53, wherein the hydrocarbon feedstock is contacted with the hydrocracking conditions comprise a temperature of 50° F. (about 288° C.) to about 800° F. (about 427° C.); a total pressure from about 300 psig, (about 2.1 MPag) to about 3000 psig (about 20.7 MPag); an LHSV from about 0.1 hr$^{-1}$ to about 20 hr$^{-1}$; and a hydrogen treat gas rate from about 500 scf/bbl (about 85 Nm$^3$/m$^3$) to about 10000 scf/bbl (about 1700 Nm$^3$/m$^3$).

55. The process of claim 54, wherein the hydrocarbon feedstock comprises gasoil having an initial boiling point above about 400° F. (204° C.), a T50 boiling point of at least about 600° F. (316° C.), and an end boiling point of at least about 750° F. (399° C.).

56. The process of claim 54, wherein the hydrocarbon feedstock contains at least 50 wt % hydrocarbons with boiling points above 750° F. (399° C.).

57. The process of claim 53, wherein the zeolite has a Large-to-Small Pore Volume Ratio of at least about 4.0.

58. The process of claim 53, wherein the unit cell size of the zeolite is less than about 24.45 Angstroms.

59. The process of claim 53, wherein the inorganic matrix is comprised of silica, alumina, or combinations thereof.

60. The process of claim 53, wherein the inorganic matrix is comprised of alumina.

61. The process of claim 53, wherein the catalyst is comprised of at least one Group 8 metal selected from Pt and Pd.

62. The process of claim 53, wherein the catalyst is comprised of at least one Group 6 metal and one Group 8/9/10 metal.

63. The process of claim 59, wherein the catalyst is comprised of at least one Group 6 metal and one Group 8/9/10 metal.

64. The process of claim 63, wherein the Group 6 metal is selected from Cr, Mo, and W, and the Group 8/9/10 metal is selected from Fe, Co, Ni, Ru, Rh, Pd, Os, Ir, and Pt.

65. The process of claim 64, wherein the Group 6 metal is Mo and the Group 8/9/10 metal is selected from Co.

66. The process of claim 64, wherein the Group 6 metal is W and the Group 8/9/10 metal is selected from Ni.

67. The process of claim 64, wherein the combined amount of Group 6 metal and one Group 8/9/10 metal is from 1 wt % to 25 wt %.

68. The process of claim 67, wherein the zeolite is present in the catalyst in an amount of at least 10 wt % based on the catalyst weight.

69. The process of claim 68, wherein the catalyst has a 40 Å Peak of less than about 0.15 cm$^3$/g.

70. The process of claim 53, wherein the zeolite has been made from a zeolite precursor wherein the zeolite precursor is subjected to a high temperature steam calcination step at a temperature from about 1200° F. to about 1500° F. wherein the temperature of the zeolite precursor is within 50° F. of the high temperature steam calcination temperature in less than 5 minutes.

71. The process of claim 70, wherein the Na$_2$O content of the precursor of the zeolite prior to the high temperature steam calcination step is from about 2 to about 5 wt % of the total precursor weight on a dry basis.

72. The process of claim 69, wherein the Small Mesopore Volume Peak of the zeolite is less than about 0.13 cm$^3$/g.

73. The process of claim 72, wherein the Large Mesopore Volume of the zeolite is at least about 0.05 cm$^3$/g.

* * * * *